United States Patent
Maguire et al.

(10) Patent No.: US 12,528,740 B2
(45) Date of Patent: Jan. 20, 2026

(54) HEMP BASED GEOPOLYMER COMPOSITIONS AND METHODS OF USE THEREOF

(71) Applicant: NUtech Ventures, Lincoln, NE (US)

(72) Inventors: Marc Maguire, Omaha, NE (US); Mohammad Mastali, Omaha, NE (US)

(73) Assignee: NUtech Ventures, Lincoln, NE (US)

( * ) Notice: Subject to any disclaimer, the term of this patent is extended or adjusted under 35 U.S.C. 154(b) by 589 days.

(21) Appl. No.: 17/816,286

(22) Filed: Jul. 29, 2022

(65) Prior Publication Data

US 2023/0047807 A1 Feb. 16, 2023

Related U.S. Application Data

(60) Provisional application No. 63/226,897, filed on Jul. 29, 2021.

(51) Int. Cl.
| | |
|---|---|
| *C04B 16/02* | (2006.01) |
| *C04B 22/06* | (2006.01) |
| *C04B 28/08* | (2006.01) |
| *C04B 28/24* | (2006.01) |

(52) U.S. Cl.
CPC ............ *C04B 16/02* (2013.01); *C04B 22/062* (2013.01); *C04B 28/08* (2013.01); *C04B 28/24* (2013.01)

(58) Field of Classification Search
CPC ....... C04B 16/02; C04B 22/062; C04B 28/08; C04B 28/24; C04B 28/006; C04B 28/008; C04B 28/04; Y02W 30/91
See application file for complete search history.

(56) References Cited

U.S. PATENT DOCUMENTS

| | | | |
|---|---|---|---|
| 10,800,704 B2 | 10/2020 | Ziehl et al. | |
| 2019/0248987 A1* | 8/2019 | Moolman | ............... C04B 28/10 |

FOREIGN PATENT DOCUMENTS

| | | | | |
|---|---|---|---|---|
| EP | 3415478 B1 * | 4/2020 | ........... | C04B 18/248 |
| NZ | 720558 | 7/2021 | | |
| WO | 2017013413 | 1/2017 | | |

OTHER PUBLICATIONS

Rabah et al "Formulation of modified cement mortars using optimal combination of fly ashes, shiv and hemp fibers", Journal of Materials in Civil Engineering, DOI: 10.1061/(ASCE)MT.1943-5533.0002918. (Year: 2020).*

Guo, Aofei et al., Hydration of Portland Cement Pastes Containing Untreated and Treated Hemp Powders, Apr. 2020, Journal of Materials in Civil Engineering 32(6).

M. Mastali et al., Carbon dioxide sequestration of fly ash alkaline-based mortars containing recycled aggregates and reinforced by hemp fibres, Construction and Building Materials, May 2018.

Brasileiro et al., Use of coir pith particles in composites with Portland cement, J Environ Manage, Dec. 15, 2013; 131:228-38.

* cited by examiner

*Primary Examiner* — Anthony J Green
(74) *Attorney, Agent, or Firm* — Womble Bond Dickinson (US) LLP

(57) ABSTRACT

Provided here are hemp-based concrete compositions and methods of production of these compositions. These compositions contain an aggregate containing coarse hemp hurd and an alkali-activated binder including a hemp powder derived from a woody core of a hemp plant.

15 Claims, 14 Drawing Sheets

HEMP BASED GEOPOLYMER COMPOSITIONS AND METHODS OF USE THEREOF

CROSS-REFERENCE TO RELATED APPLICATIONS

This application claims the benefit of and priority to U.S. Provisional Application No. 63/226,897, filed Jul. 29, 2021, which is incorporated by reference herein in its entirety.

TECHNICAL FIELD

The disclosure relates to hemp-based geopolymers, including construction compositions containing alkali-activated hemp products.

BACKGROUND

Construction materials have experienced rapid development throughout the past decades. These developments mainly aim to improve mechanical properties, increase durability, and improve the sustainability of construction materials. Sustainable concrete production requires efforts to replace conventional cement partially or fully, which is responsible for about 5-7% of the global total carbon dioxide ($CO_2$) emissions. Concrete is a construction material containing an aggregate and a binder. Aggregates are usually sand and gravel or crushed stone, while binders are usually cement and water. Mortar is composed of binder, fine sands, and lime and is used as a binding material when building with brick, block, and stone. Alkali-activated binders have been represented as an alternative to cement-based binders. These binders are commonly composed of aluminosilicate precursors, alkali solutions, and aggregates. Alkali-activated binders have shown acceptable mechanical and durability properties, and they can incorporate waste materials in their production. Nevertheless, alkali-activated binders have problems that limit their application, such as significant drying shrinkage, high efflorescence, low strength, and long or short setting time.

SUMMARY

Provided here are compositions and methods to address these shortcomings of the art and provide other additional or alternative advantages. The disclosure herein provides one or more embodiments of hemp-based compositions and methods of making and using them. One such composition includes an aluminosilicate-based binder containing a first hemp derivative and an aggregate containing a second hemp derivative. The first and second derivatives are derived from a woody core of a hemp plant. The first hemp derivative can be substantially hemp hurd powder. The second hemp derivative can be substantially coarse hemp hurd. The aluminosilicate-based binder can be one or more of ordinary Portland cement (OPC), lime, zeolite, magnesium oxide cement, magnesium phosphate cement, and ground granulated blast furnace slag.

Embodiments of hemp-based compositions include hemp-based concrete compositions. One such comprising an aluminosilicate-based binder containing hemp hurd powder, a mineral aggregate, and an alkali activator. In certain embodiments, the hemp-based concrete compositions contain coarse hemp hurd. The mineral aggregate can contain river sand, fly ash, or a combination thereof. The alkali activator can contain one or more of a silicate, a metal aluminate, an alkali-metal hydroxide, ammonium hydroxide, and an alkaline earth metal hydroxide. The alkali activator contains sodium silicate and sodium hydroxide. The hemp-based concrete compositions can contain the hemp hurd powder in the admixture at an amount ranging from about 1 wt. % to about 20 wt. %. The hemp-based concrete compositions can contain the hemp hurd powder in the admixture at an amount ranging greater than about 1 wt. %. The hemp-based concrete compositions can contain the hemp hurd powder in the admixture at an amount ranging greater than about 5 wt. %.

Embodiments include methods of production of hemp-based concrete compositions with a binder containing a first hemp derivative and an aggregate containing a second hemp derivative. The first and second derivatives are derived from a woody core of a hemp plant. The first hemp derivative can be substantially hemp hurd powder. The second hemp derivative can be substantially coarse hemp hurd. One such method includes the following steps: combining a first hemp derivative and a binder component to form an admixture, combining an aqueous solution of an alkali activator with the admixture to form a slurry, and supplying a second hemp derivative to the slurry to form a hemp-based concrete composition.

Embodiments herein include methods for producing a hemp-based construction composition. One such method combining hemp hurd powder and a binder component to form an admixture; supplying an aqueous solution of an alkali activator to the admixture to form a binder slurry; combining hemp hurd with the binder slurry to form a hemp-based concrete slurry; supplying the hemp-based concrete slurry to a plurality of molds; and allowing the hemp-based concrete slurry to harden in the plurality of molds, thereby producing the hemp-based construction composition. In certain embodiments, the aqueous solution of the alkali activator contains one or more of a silicate, a metal aluminate, an alkali-metal hydroxide, ammonium hydroxide, and an alkaline earth metal hydroxide. The hemp-based concrete compositions can contain the hemp hurd powder in the admixture at an amount ranging from about 1 wt. % to about 20 wt. %. The hemp-based concrete compositions can contain the hemp hurd powder in the admixture at an amount ranging greater than about 1 wt. %. The hemp-based concrete compositions can contain the hemp hurd powder in the admixture at an amount ranging greater than about 5 wt. %. The binder component can be one or more of ordinary Portland cement (OPC), lime, zeolite, magnesium oxide cement, magnesium phosphate cement, and ground granulated blast furnace slag. In certain embodiments, the binder component is ground granulated blast furnace slag. The alkali activator can contain one or more of a silicate, a metal aluminate, an alkali-metal hydroxide, ammonium hydroxide, and an alkaline earth metal hydroxide. The alkali activator contains sodium silicate and sodium hydroxide. In certain embodiments, the alkali activator contains sodium silicate and sodium hydroxide at a ratio of 2.5:1 and at a molality of 10 M.

Certain embodiments of the hemp-based construction compositions have a density of less than about 1.5 $g/cm^3$. Certain embodiments of the hemp-based construction compositions have a compressive strength greater than 4 MPa. Certain embodiments of the hemp-based construction compositions have a global warming potential ranging from about 300 $kgCO_{2eq}/m^3$ to about 700 $kgCO_{2eq}/m^3$. Certain embodiments of the hemp-based construction compositions have a $CO_2$ sequestration ranging from about 90 $kgCO_{2eq}/m^3$ to 180 $kgCO_{2eq}/m^3$.

BRIEF DESCRIPTION OF THE DRAWINGS

Embodiments will be readily understood by the following detailed description in conjunction with the accompanying drawings. Embodiments are illustrated by way of example and not by way of limitation in the accompanying drawings.

DETAILED DESCRIPTION

Figure 1A:
FIGS. 1A and 1B are photographs of the hemp hurd powder and the coarse hemp hurd, respectively, according to an embodiment.

The present disclosure describes various embodiments related to cement compositions containing hemp-based polymers, methods of making these compositions, and methods of use thereof. Further embodiments may be described and disclosed.

In the following description, numerous details are set forth in order to provide a thorough understanding of the various embodiments. In other instances, well-known processes, devices, and systems may not been described in particular detail in order not to unnecessarily obscure the various embodiments. Additionally, illustrations of the various embodiments may omit certain features or details in order to not obscure the various embodiments.

In the following detailed description, reference is made to the accompanying drawings that form a part of this disclosure. Like numerals may designate like parts throughout the drawings. The drawings may provide an illustration of some of the various embodiments in which the subject matter of the present disclosure may be practiced. Other embodiments may be utilized, and logical changes may be made without departing from the scope of this disclosure.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous.

As previously discussed, alkali-activated binders have problems that limit their application, such as significant drying shrinkage, high efflorescence, low strength, and long or short setting time. Disclosed here are embodiments to address these drawbacks. These embodiments were developed by selecting the suitable precursor type and content, the alkali activation properties and content, and the curing method. Supplementary cementitious materials (SCM), such as fly ash, are used as a potential aluminosilicate precursor in producing alkali-activated binders. The aggregates used in producing alkali-activated binders can either be natural or recycled. As an aggregate is an essential component in concrete, utilizing recycled aggregate can reduce the global demand on natural aggregate and have significant impact on the weight, cost, and properties of alkali-activated concrete. Plant-based aggregate is a sustainable option in producing mixtures with alkali-activated binders. Utilizing this type of renewable aggregate creates links between the construction and agricultural industries and help reduce the construction sector's ecological impact.

Embodiments include construction materials containing hemp derivatives. Hemp derivatives as used herein refer to any substance or product derived or collected or extracted from a hemp plant, including but not limited to products from a woody core of a hemp plant. Hemp hurd is the woody core (xylem and pith) of the hemp plant and a by-product of the hemp industry. Hemp hurd characterized by its lightweight and good acoustic properties due to its porous structure, good thermal insulation properties, rapid growth rate, and high ability of carbon dioxide sequestration. Hemp hurd powder has a particle size ranging from about 1 micrometer (µm) to about 100 µm or less. In certain embodiments, the particle size can range from about 1 µm to about 75 µm. In certain embodiments, the particle size can range from about 10 µm to about 70 µm. The coarse hemp hurd has particle dimensions ranging from about 0.1 mm to about 40 mm, or from about 1 mm to about 30 mm, or from about 1 mm to about 20 mm, or from about 1 mm to about 10 mm, or from about 1 mm to about 7 mm. In certain embodiments, the coarse hemp hurd has average particle dimensions of about 10 mm. In certain embodiments, the coarse hemp hurd has average particle dimensions of about 5 mm. In certain embodiments, the coarse hurd can be separated from bast fibers by hammer milling hemp stalks and passing the materials through a screen, whose pore sizing can be varied to vary the size of the hemp hurd. Hemp hurd powder can be produced by milling the hemp hurd down to the desired particle sizes for a powder.

Embodiments include hemp-based concrete compositions with a binder containing a first hemp derivative and an aggregate containing a second hemp derivative. In certain embodiments, the first hemp derivative contains substantially hemp hurd powder. In certain embodiments, the second hemp derivative contains substantially coarse hemp hurd. Embodiments include a hemp-based concrete composition containing an aluminosilicate binder with hemp hurd powder and an alkali activator, and coarse hemp hurd as a component of the aggregate. As used herein, "substantially contains(ing)" means that the composition or component may include other ingredients, so long as the other ingredients do not constitute more than 20% by mass or more relative to the whole composition. Embodiments include hemp-based concrete compositions with a binder containing a first hemp derivative and a rock or a mineral aggregate. Mineral aggregates include one or more of silica, silicates, carbonates, sulfates, iron sulfides, and iron oxides. Rock aggregates include one or more of igneous rocks (such as granite, syenite, diorite, gabbro, peridotite, volcanic glass, felsite, and basalt), sedimentary rocks (such as conglomerate, sandstone, claystone, shale, limestone, dolomite, chalk, and chert), and metamorphic rocks (such as marble, slate, phyllite, schist, amphibolite, hornfels, and gneiss).

Embodiments include hemp-based binder compositions containing a hemp derivative and an aluminosilicate-based binder. The hemp derivative can be combined with a mineral admixture, which is suitable for alkali-activated cementitious composites to produce an aluminosilicate-based binder. Embodiments include an alkali-activated binder containing hemp hurd powder, river sand, fly ash, and an alkali activator. The hemp-based binders can be used as a mortar, plaster/render, crack filler and as a plaster repair material.

The alkali activator can contain one or more of a silicate, a metal aluminate, an alkali-metal hydroxide, ammonium hydroxide, and an alkaline earth metal hydroxide. In certain embodiments, the alkali activator contains one or more of sodium silicate and sodium hydroxide. The alkali activator can be an aqueous mixture of sodium silicate and sodium hydroxide. The amount of sodium silicate and sodium hydroxide in a particular mixture can range from a ratio of 3:1 to 1:1. In certain embodiments, the alkali activator can be an aqueous mixture of sodium silicate and sodium hydroxide at a ratio of 2.5:1 and at a molality of 10 M.

In certain embodiments, the hemp-based concrete contains different binders in addition to a hemp derivative. These binders include but are not limited to ordinary Portland cement (OPC), lime, a combination of lime and cement, binders containing zeolite, magnesium oxide cement, magnesium phosphate cement, ground granulated blast furnace slag, and binders comprised of supplementary cementitious materials. Hemp derivatives include coarse hemp hurd, hemp hurd powder, hemp fibers, or a combination thereof.

Embodiments include an alkali-activated hemp-based composition containing coarse hemp hurd as a natural aggregate and hemp hurd powder as a part of the binder. Embodiments include this composition being suitable for building products, such as lightweight masonry units using alkali-activated hemp-based materials. In certain embodiments, the binder contains alkali-activated ground granulated blast furnace slag (GGBFS) and coarse hemp hurd powder. Coarse hemp hurd is used to replace mineral aggregate in the mixture compositions. Various embodiments disclosed and described may relate to high-strength lightweight alkali-activated bricks containing hemp hurd powder and coarse hemp hurd.

Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps. It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

In certain embodiments, the hemp-based concrete compositions have a density ranging from about 0.8 $g/cm^3$ to about 1.5 $g/cm^3$, or from about 0.9 $g/cm^3$ to about 1.5 $g/cm^3$, or from about 1 $g/cm^3$ to about 1.4 $g/cm^3$, or from about 1.1 $g/cm^3$ to about 1.4 $g/cm^3$, or from about 1.15 $g/cm^3$ to about 1.3 $g/cm^3$. In certain embodiments, the alkali-activated hemp-based concrete compositions have a density of about 0.8 $g/cm^3$. In certain embodiments, the alkali-activated hemp-based concrete compositions have a density of about 0.9 $g/cm^3$. In certain embodiments, the alkali-activated hemp-based concrete compositions have a density of about 1 $g/cm^3$. In certain embodiments, the alkali-activated hemp-based concrete compositions have a density of about 1.2 $g/cm^3$ or lower. In certain embodiments, the alkali-activated hemp-based concrete compositions have a density of about 1.3 $g/cm^3$ or lower.

In certain embodiments, the alkali-activated hemp-based concrete compositions have a compressive strength ranging from about 4 MPa to about 25 MPa, or from about 5 MPa to about 20 MPa, or from about 10 MPa to about 25 MPa, or from about 10 MPa to about 20 MPa, or from about 15 MPa to about 25 MPa, or from about 15 MPa to about 20 MPa. In certain embodiments, the alkali-activated hemp-based concrete compositions have a compressive strength of about 4 MPa or greater. In certain embodiments, the alkali-activated hemp-based concrete compositions have a compressive strength of about 6 MPa or greater. In certain embodiments, the alkali-activated hemp-based concrete compositions have a compressive strength of about 10 MPa or greater. In certain embodiments, the alkali-activated hemp-based concrete compositions have a compressive strength of about 15 MPa or greater.

In certain embodiments, the alkali-activated hemp-based concrete compositions have a water absorption by immersion ranging from about 25% to about 50%, or from about 30% to about 50%, or from about 35% to about 50%, or from about 25% to about 45%, or from about 30% to about 45%, or from about 35% to about 45%, or from about 35% to about 45%.

In certain embodiments, the alkali-activated hemp-based concrete compositions have a capillary coefficient ranging from about 0.01 $kg/m^2\ min^{0.5}$ to about 0.2 $kg/m^2\ min^{0.5}$, or from about 0.015 $kg/m^2\ min^{0.5}$ to about 0.15 $kg/m^2\ min^{0.5}$, or from about 0.015 $kg/m^2\ min^{0.5}$ to about 0.14 $kg/m^2$ min$^{0.5}$, or from about 0.02 kg/m$^2$ min$^{0.5}$ to about 0.14 kg/m$^2$ min$^{0.5}$, or from about 0.02 kg/m$^2$ min$^{0.5}$ to about 0.135 kg/m$^2$ min$^{0.5}$, or from about 0.025 kg/m$^2$ min$^{0.5}$ to about 0.135 kg/m$^2$ min$^{0.5}$, or from about 0.0267 kg/m$^2$ min$^{0.5}$ to about 0.133 kg/m$^2$min$^{0.5}$.

In certain embodiments, the alkali-activated hemp-based concrete compositions have a global warming potential ranging from about 250 kgCO$_{2eq}$/m$^3$ to about 750 kgCO$_{2eq}$/m$^3$, or from about 260 kgCO$_{2eq}$/m$^3$ to about 740 kgCO$_{2eq}$/m$^3$, or from about 270 kgCO$_{2eq}$/m$^3$ to about 730 kgCO$_{2eq}$/m$^3$, or from about 280 kgCO$_{2eq}$/m$^3$ to about 720 kgCO$_{2eq}$/m$^3$, or from about 280 kgCO$_{2eq}$/m$^3$ to about 700 kgCO$_{2eq}$/m$^3$, or from about 280 kgCO$_{2eq}$/m$^3$ to about 690 kgCO$_{2eq}$/m$^3$, or from about 300 kgCO$_{2eq}$/m$^3$ to about 650 kgCO$_{2eq}$/m$^3$. In certain embodiments, the alkali-activated hemp-based concrete compositions have a global warming potential greater than about 400 kgCO$_{2eq}$/m$^3$. In certain embodiments, the alkali-activated hemp-based concrete compositions have a global warming potential greater than about 500 kgCO$_{2eq}$/m$^3$. In certain embodiments, the alkali-activated hemp-based concrete compositions have a global warming potential greater than about 600 kgCO$_{2eq}$/m$^3$.

In certain embodiments, the alkali-activated hemp-based concrete compositions have a CO$_2$ sequestration ranging from about 80 kgCO$_{2eq}$/m$^3$ to about 200 kgCO$_{2eq}$/m$^3$, or from about 90 kgCO$_{2eq}$/m$^3$ to about 200 kgCO$_{2eq}$/m$^3$, or from about 100 kgCO$_{2eq}$/m$^3$ to about 180 kgCO$_{2eq}$/m$^3$, or from about 100 kgCO$_{2eq}$/m$^3$ to about 175 kgCO$_{2eq}$/m$^3$, or from about 120 kgCO$_{2eq}$/m$^3$ to about 180 kgCO$_{2eq}$/m$^3$. In certain embodiments, the alkali-activated hemp-based concrete compositions have a CO$_2$ sequestration greater than 90 kgCO$_{2eq}$/m$^3$. In certain embodiments, the alkali-activated hemp-based concrete compositions have a CO$_2$ sequestration greater than 100 kgCO$_{2eq}$/m$^3$. In certain embodiments, the alkali-activated hemp-based concrete compositions have a CO$_2$ sequestration greater than 120 kgCO$_{2eq}$/m$^3$.

Embodiments include methods of production of hemp-based concrete or mortar compositions. Embodiments include methods of production of hemp-based concrete compositions with a binder containing a first hemp derivative and an aggregate containing a second hemp derivative. One such method includes the following steps: combining a first hemp derivative and a binder component to form an admixture, combining an aqueous solution of an alkali activator with the admixture to form a slurry, and supplying a second hemp derivative to the slurry to form a hemp-based concrete composition. In certain embodiments, each of the hemp derivatives can be soaked in the activator to affect certain properties, such as the unhardened workability. The binder component can be one or more of ordinary Portland cement (OPC), lime, a combination of lime and cement, zeolite, magnesium oxide cement, magnesium phosphate cement, ground granulated blast furnace slag, and other supplementary cementitious materials. The binder component can be an aluminosilicate-based binder or any mineral admixture, which is suitable for alkali-activated cementitious composites to produce an aluminosilicate-based binder. In certain embodiments, the first hemp derivative contains substantially hemp hurd powder. The hemp hurd powder can be present in the admixture at an amount ranging from about 1 wt. % to about 20 wt. %, or from about 1 wt. % to about 10 wt. %, or about 1 wt. % to about 5 wt. %. In certain embodiments, the second hemp derivative contains substantially coarse hemp hurd. The alkali activator can contain one or more of a silicate, a metal aluminate, an alkali-metal hydroxide, ammonium hydroxide, and an alkaline earth metal hydroxide. In certain embodiments, the alkali activator contains one or more of sodium silicate and sodium hydroxide. The alkali activator can be an aqueous mixture of sodium silicate and sodium hydroxide. The amount of sodium silicate and sodium hydroxide in a particular mixture can range from a ratio of 3:1 to 1:1. In certain embodiments, the alkali activator can be an aqueous mixture of sodium silicate and sodium hydroxide at a ratio of 2.5:1 and at a molality of 10 M.

Embodiments include methods of production of hemp-based construction compositions with a binder containing a first hemp derivative and an aggregate containing a second hemp derivative. One such method includes the following steps: combining a first hemp derivative and a binder component to form an admixture, combining an aqueous solution of an alkali activator with the admixture to form a slurry, supplying a second hemp derivative to the slurry to form a hemp-based concrete composition, supplying the hemp-based concrete composition to a plurality of molds; and allowing the hemp-based concrete composition to harden in the plurality of molds, thereby producing the hemp-based construction compositions. The construction compositions can be bricks, tiles, roofing materials, wall materials, or flooring materials. The binder component can be one or more of ordinary Portland cement (OPC), lime, a combination of lime and cement, zeolite, magnesium oxide cement, magnesium phosphate cement, ground granulated blast furnace slag, and other supplementary cementitious materials. The binder component can be an aluminosilicate-based binder or any mineral admixture, which is suitable for alkali-activated cementitious composites to produce an aluminosilicate-based binder. In certain embodiments, the first hemp derivative contains substantially hemp hurd powder. The hemp hurd powder can be present in the admixture at an amount ranging from about 1 wt. % to about 20 wt. %, or from about 1 wt. % to about 10 wt. %, or about 1 wt. % to about 5 wt. %. In certain embodiments, the second hemp derivative contains substantially coarse hemp hurd. The alkali activator can contain one or more of a silicate, a metal aluminate, an alkali-metal hydroxide, ammonium hydroxide, and an alkaline earth metal hydroxide. In certain embodiments, the alkali activator contains one or more of sodium silicate and sodium hydroxide. The alkali activator can be an aqueous mixture of sodium silicate and sodium hydroxide. The amount of sodium silicate and sodium hydroxide in a particular mixture can range from a ratio of 3:1 to 1:1. In certain embodiments, the alkali activator can be an aqueous mixture of sodium silicate and sodium hydroxide at a ratio of 2.5:1 and at a molality of 10 M.

Embodiments of the hemp-based cement compositions contain different alkali activators and hemp hurd powder. The percentage content of the alkali activators and hemp derivatives affect the compressive strength, density, water absorption by immersion and capillarity action, fire resistance, efflorescence, and carbonation resistance.

Various embodiments disclosed and described may relate to high-strength lightweight alkali-activated construction materials, such as bricks, tiles, roofing materials, flooring materials, drywall, particle boards, or fiber boards, containing hemp powder and coarse hemp hurd. Embodiments include bricks containing hemp powder and coarse hemp hurd with an alkali activator. In certain embodiments, these bricks have a density less than about 1.3 g/cm$^3$ and a compressive strength greater than 4 MPa. In addition, reducing the alkali activator content increases the carbon dioxide sequestration capacity up to 180 kgCO$_2$ eq/m$^3$ for the developed alkali-activated hemp-based materials.

mixtures. Furthermore, the amounts of water released into the mixture from the pre-soaking approach cannot be controlled. To overcome this problem, additional water was added into the mixture through using alkali-activators. Using this approach, one can control the input water in the mixture.

The chemical composition of grade 100 GGBFS used in this study is listed in Table 1. It indicates that the GGBFS is rich in calcium oxide (CaO) and silicon oxide (SiO$_2$), and it is used as a precursor in the produced alkali-activated hemp mortar. The relative density of GGBFS typically ranges from 1050 to 1375 kg/m$^3$.

TABLE 1

Chemical composition of major oxides in calcined hemp and GGBFS measured by XRF

| Material | Oxides (wt %) | | | | | | | | | | | |
|---|---|---|---|---|---|---|---|---|---|---|---|---|
| | CaO | SiO$_2$ | K$_2$O | Na$_2$O | P$_2$O$_5$ | SO$_3$ | MnO | TiO$_2$ | AL$_2$O$_3$ | Cr$_2$O$_3$ | Fe$_2$O$_3$ | MgO |
| Calcined hemp | 40 | 28 | 15 | 10 | 4 | 3 | — | — | — | — | — | — |
| GGBFS | 46.88 | 33 | 0.61 | 0.16 | — | 2.75 | 0.93 | 0.73 | 7 | 0.06 | 0.71 | 7.15 |

EXAMPLES

Various examples are provided to illustrate selected aspects of the hemp-based compositions.

Example 1

Certain compositions contain the following components: the hemp powder, GGBFS, the coarse hemp hurd, and an alkali-activator. To prepare the alkali-activator, sodium hydroxide (NaOH) and sodium silicate (Na$_2$SO$_3$) were mixed at a ratio of 2.5. Solid NaOH flakes were mixed with distilled water to have liquid sodium hydroxide with a molarity of 10 mol/L. The mixing process was performed twenty-four hours prior to mixing the materials. This molarity has significant effect on gaining the mechanical strength of alkali-activated materials (AAM).

Figure 1B:

As shown in FIGS. 1A and 1B, two forms of hemp: hemp powder and coarse hemp hurd, were used in the prepared mixtures. The hemp powder has a particle size of 50 micrometers (μm) or less. The hemp powder is rich in calcium and silicon based on the results of the XRF analysis shown in Table 1. Embodiments can also include coarse hemp hurd which has a significant impact on the ability to produce a lightweight material as it acts as lightweight aggregate. This material is produced as a waste product from fiber and leaf production with little other beneficial use. The hurd comes from the woody core and is hammered to about 5 mm. The coarse hemp hurd has a porous, cellular structure, which may negatively affect the strength of the mixtures. Furthermore, hemp hurd has a high-water absorption rate, which reduces the workability and the amount of water available for the chemical reactions. A common practice to overcome these limitations and improve the adhesion between the hemp and its surrounded matrix is to pre-soak the hemp before using it. The hemp can be presoaked in a selected alkali activator solution, calcium hydroxide aqueous solution, or water. If hemp is pre-soaked in water, the absorbed water released in the mixture can dilute the alkali activator and reduce pH values. These parameters significantly affect the fresh and hardened state properties of the Seven mixes were prepared during a two-phase experimental program which is listed in Table 2. In the first phase, the contents of the hemp hurd powder (20% by volume), GGBFS (80% by Vol.), and the hemp-hurd-to-binder ratio of 45 were all kept constant. However, varying amounts of sodium silicate and sodium hydroxide were used in each mixture to investigate the effects of the alkali-activation process on the matrix properties of the developed hemp hurd-based alkali-activated material. In the second phase, all mixture contents were kept constant except for the amounts of the hemp hurd, which were gradually increased. The increase in hemp hurd was performed to study the influence of its content on the ability to produce lightweight materials.

TABLE 2

Designed mixes to develop alkali-activated material using hemp powder and hurd

| Mixture ID | Binder | | Hemp hurd/ Binder | Alkali activator | |
|---|---|---|---|---|---|
| | Hemp powder | GGBFS | | SS | SH |
| 1 | 20 | 80 | 45 | 1.92 | 0.83 |
| 2 | | | | 1.51 | 0.65 |
| 3 | | | | 1.29 | 0.56 |
| 4 | | | | 1.08 | 0.46 |
| 5 | | | | 0.86 | 0.37 |
| 6 | | | 53 | | |
| 7 | | | 60 | | |

Various tests were performed to measure the properties of the compositions. The number and dimensions of each specimen and the testing standards used are mentioned.

Density: For each mixture, three cubic specimens with an edge of 50 mm were prepared. The weight and dimensions of each cubic specimen were measured. A digital caliper was used to measure the dimensions of each cube. The dry density was then calculated by dividing the mass of each specimen by the apparent volume. The reported density is the average of three measured samples for each mixture composition.

Figure 2:
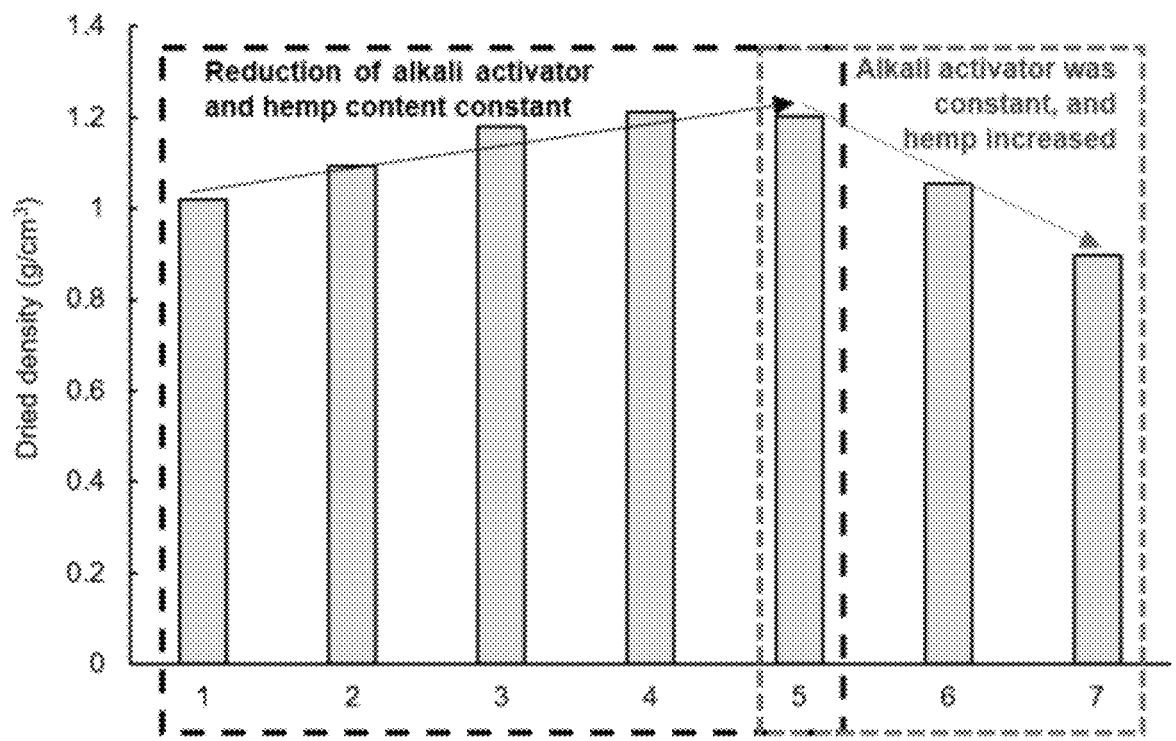
FIG. 2 is a graphical representation of the effects of the alkali activator and the hemp content on the dry density of the hemp-based compositions, according to an embodiment.

FIG. 2 is a graphical representation of the effects of the alkali activator and the hemp content on the dry density of the hemp-based compositions. Gradually, reducing the alkali-activator content in the mixture while maintaining a constant hemp content has resulted in an increase in the dry density up to a maximum of 1.21 g/cm3 for mixture 4 (SS=1.08, SH=0.46 by volume). Reducing the alkali-activator content for a certain volume indicates that the amount of the binder material in the mixture is greater than the amount of alkali activator. If the alkali-activator content is sufficient for the amount of the binder material available, a denser matrix will be formed which increases the apparent density. The results also indicate that increasing the hemp content while maintaining a constant content of the alkali activator has reduced the dry density down to approximately 0.90 g/cm3 for mixture 7. The coarse hemp hurd acts as lightweight aggregate in the mixture, which constitute a large part of its volume. Therefore, increasing the hemp hurd content reduced the density of the mixture up to a certain point. The density reported in the literature for hemp concrete incorporating lime-based binder is generally lower than the density of the alkali-activated hemp alkali-activated hemp composite disclosed here.

Figure 3:
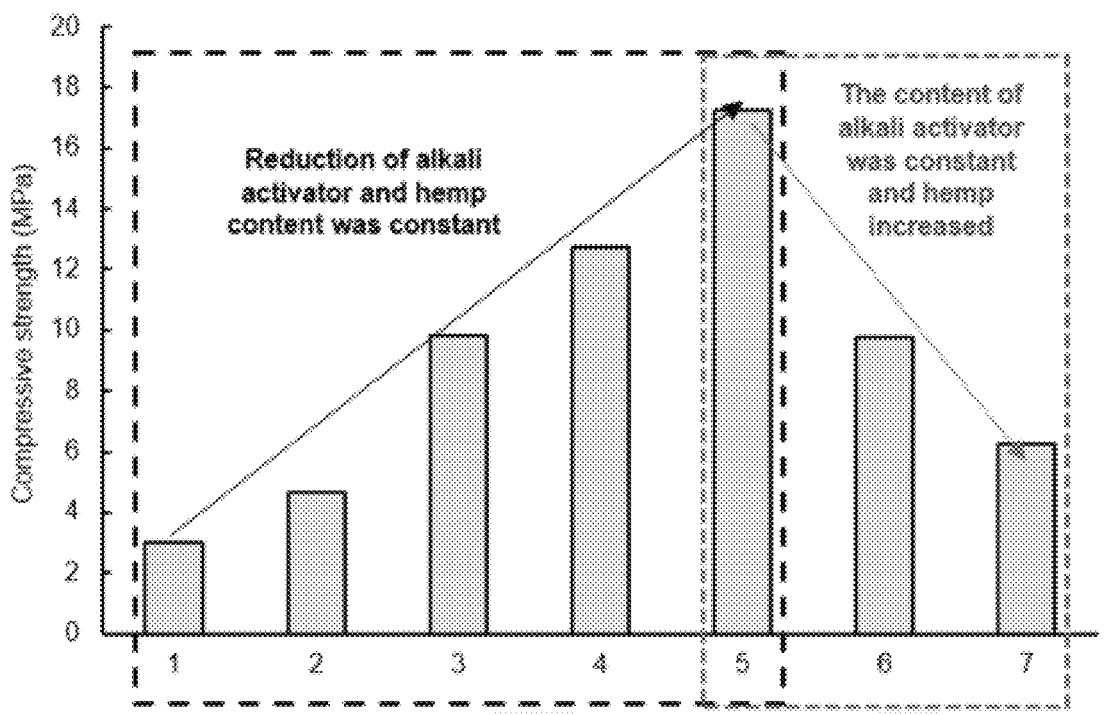
FIG. 3 is a graphical representation of the effects of the alkali activator and hemp content on the compressive strength, according to an embodiment.

Compressive strength: Cubic specimens with 50 mm nominal edge lengths were used for the compression testing in accordance with ASTM C109/C109M. A displacement rate of 1.8 mm/min and a load cell with a capacity of 100 KN were used. The results were averaged from three tested samples at 14 days for each mixture. The effect of using different proportions of the alkali activator and coarse hemp hurd on the compressive strength is shown in FIG. 3. FIG. 3 is a graphical representation of the effects of the alkali activator and hemp content on the compressive strength. The maximum compressive strength was recorded for mixture 5 (SS=0.86, SH=0.37) with approximately six times the compressive strength value of mixture 1 (SS=1.92, SH=0.93). The increase in the compressive strength among these mixtures can be explained as follows. First, the amount of water involved in the chemical reaction is reduced because of reducing the alkali activator content. Second, as the amount of binder (GGBFS and hemp powder) is constant, the chemical ratios of calcium to sodium (Ca/Na) and calcium to silicon (Ca/Si) increase, which result in an overall strength gain. The compressive strength has significantly dropped when increasing the coarse hemp hurd content for mixture 7 (6.3 MPa) in comparison to mixture 5 (17.2 MPa). This is due to the increase in the amount of water absorbed because of increasing the coarse hemp hurd content and the fact that insufficient amounts of alkali ions are available to participate in the chemical reactions and form a dense matrix. The hemp-based compositions disclosed here have a good balance between low density and high strength and is suitable to produce lightweight structural bricks.

Figure 4:
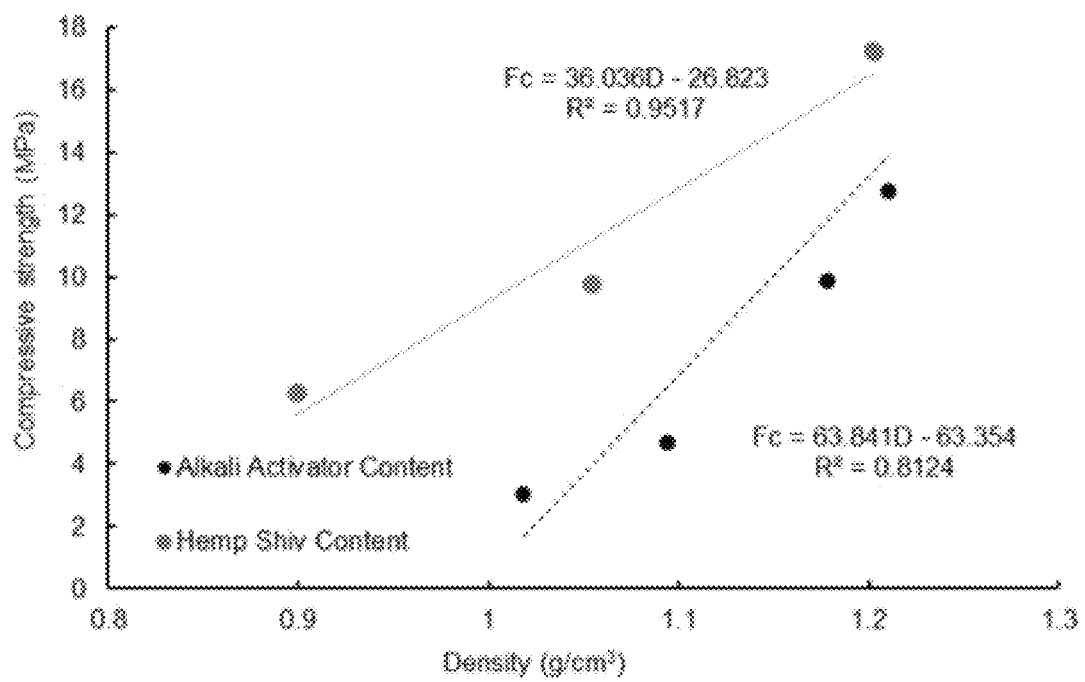
FIG. 4 is a graphical representation of the relationship between the compressive strength and the dried density, according to an embodiment.

FIG. 4 is a graphical representation of the relationship between the compressive strength and the dried density. The compressive strength is highly correlated with the dried density. However, this correlation is stronger when the hemp content increases in the mixture as compared to increasing the alkali-activator content. In contrast, the increase in compressive strength with increasing the density is more significant in the mixtures with varying alkali-activator content compared to the mixtures with varying hemp content. These results reveal that the alkali-activator content has more effect on increasing the compressive strength rate than the coarse hemp hurd.

Water absorption by immersion: Based on ASTM C1585-04, three 50-mm cubes from each mixture at the age of 28 days were initially dried at 100° C. for 48 hours. Then, the samples were submerged in water for 48 hours. Afterward, the samples were removed from the water, and the saturated weight of each sample was measured. The results were obtained by averaging three tested samples for each mixture. Water absorption (Wm) is computed using the Equation 1:

$$W_m = (M_s - M_d)/M_d \times 100 \quad (1)$$

Where $M_s$ stands for saturated mass, and $M_d$ is dry mass.

In addition, three 50-mm cubic specimens were immersed in water, and then buoyancy mass (Mb) was measured using a fixed steel basket to scale. The apparent porosity of specimens was calculated by Equation 2:

$$\text{Apparent porosity} = (M_s - M_d)/(M_s - M_b) \times 100 \quad (2)$$

Figure 5:
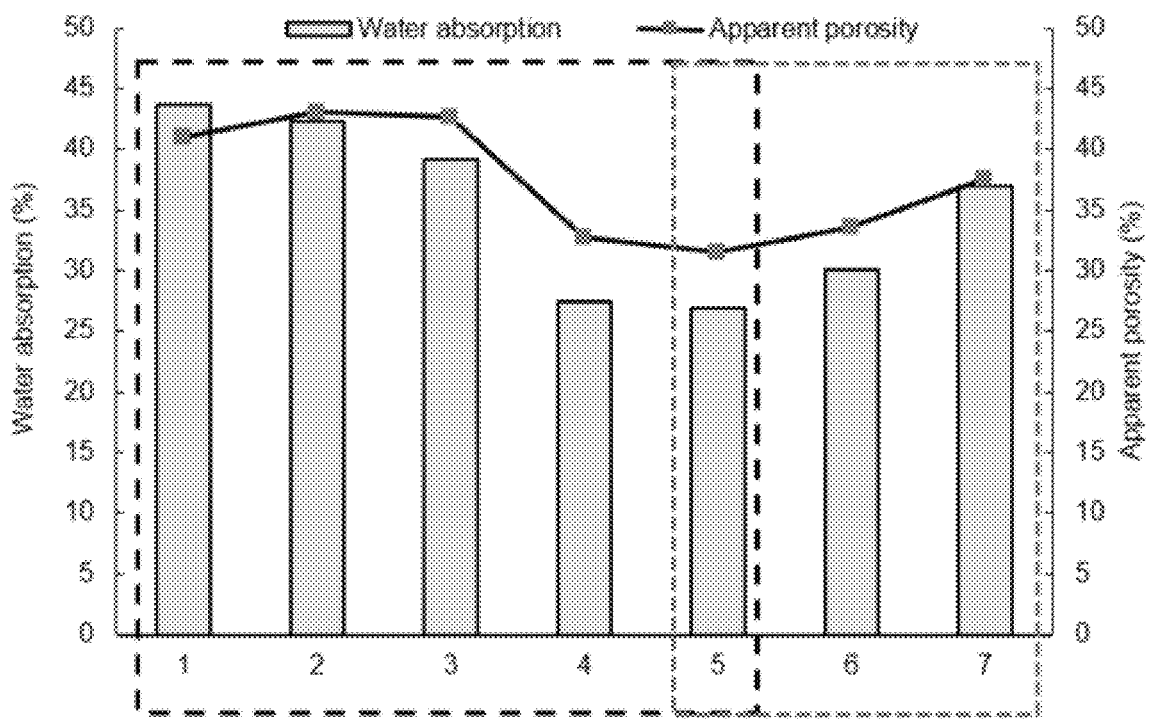
FIG. 5 is a graphical representation of the effects of the alkali activator and hemp content on the water absorption and apparent porosity, according to an embodiment.

The effect of using different proportions of the alkali activator and coarse hemp hurd on the degree of water absorption and the apparent porosity is shown in FIG. 5. The lowest degree of water absorption has been observed for mixture 5 with approximately 40% lower water absorption and 25% lower porosity than mixture 1. The reduction in water absorption is due to the dense structure associated with less air voids and a lower rate of permeability as a result of reducing the alkali activator content. In contrast, gradually increasing the hemp content has increased the water absorption and the corresponding apparent porosity for mix 6 and 7 respectively which is explained by the increased porosity associated with increasing the hemp content.

Figure 6:
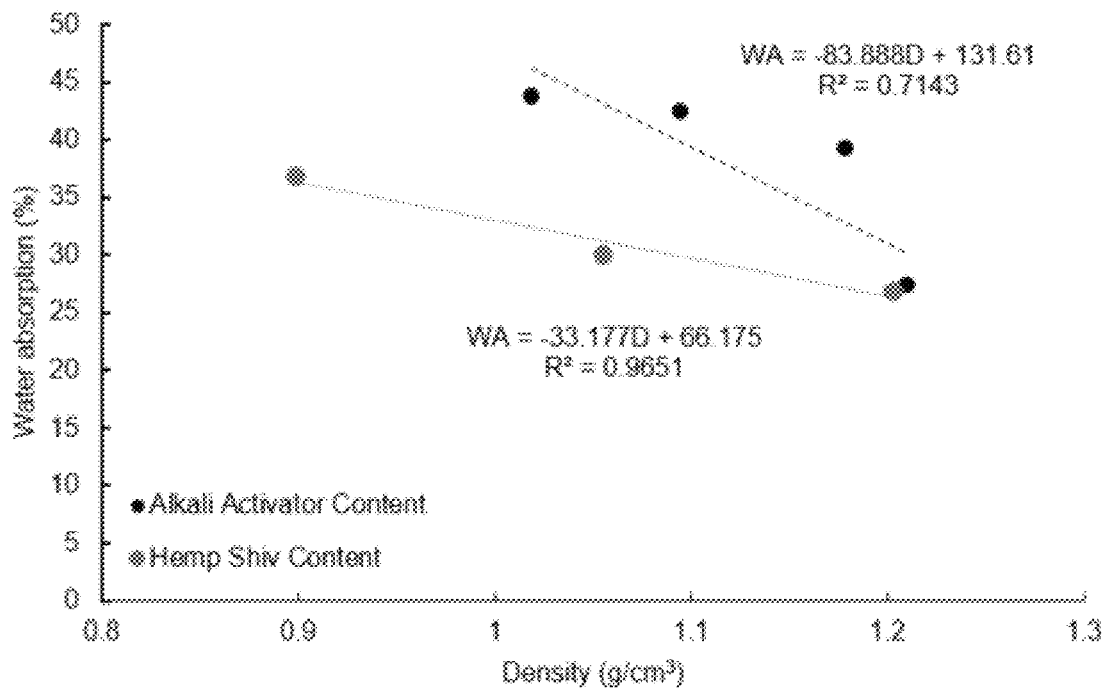
FIG. 6 is a graphical representation of the relationship between the water absorption and the dried density, according to an embodiment.

The relationship between water absorption and the dried density is shown in FIG. 6. The degree of water absorption has a relatively high correlation with the dried density. However, this correlation is higher for mixtures with varying hemp content than for mixtures with varying alkali activator content. The change in the degree of water absorption is more significant when increasing the alkali activator content which indicates that the alkali activator content has a more significant effect on the degree of water absorption in comparison to the coarse hemp hurd content.

Water absorption by capillarity: The water absorption coefficient by capillary action was measured based on BS EN1015-18:2002. The lateral surfaces of three 50-mm cubic specimens of 28 days' age were covered by paraffin. The capillary water absorption coefficient was calculated using Equation 3. Aw is the capillary water absorption coefficient, A is the surface area, ΔB is the absorbed mass, and √t is the time (min 0.5).

$$A_w = \Delta B/(A\sqrt{t}) \quad (3)$$

Figure 7A:
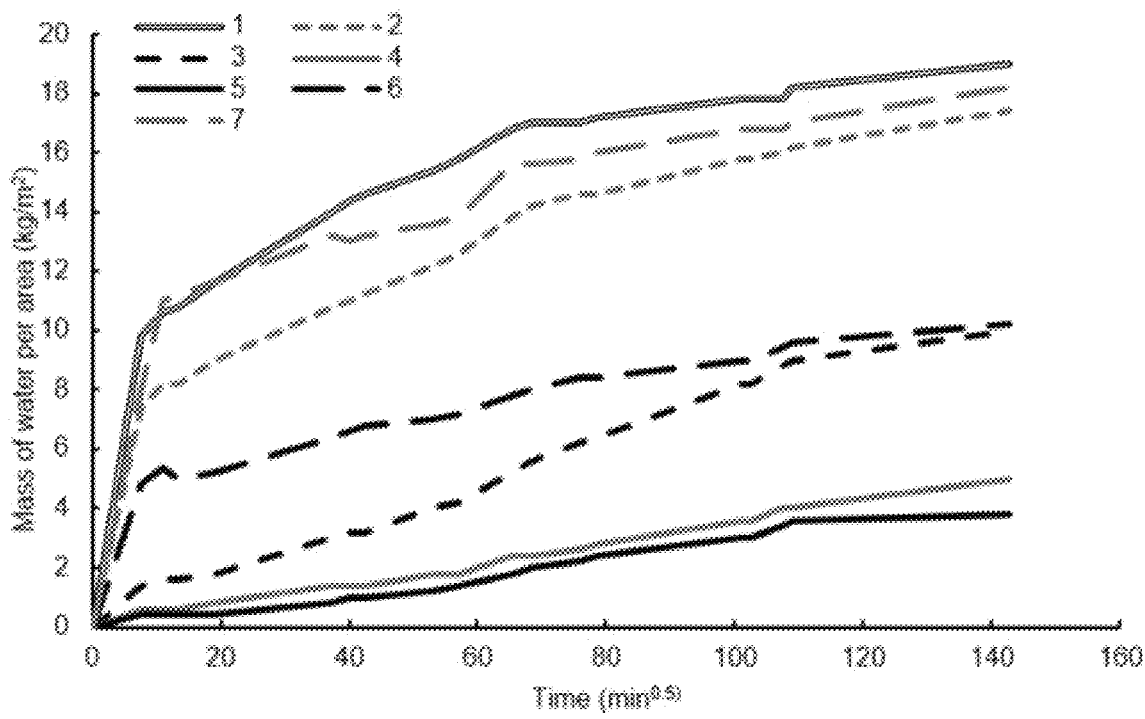
FIG. 7A is a graphical representation of the cumulative mass of water vs. time for each of the test hemp-based mixtures of Table 2, according to an embodiment.
Figure 7B:
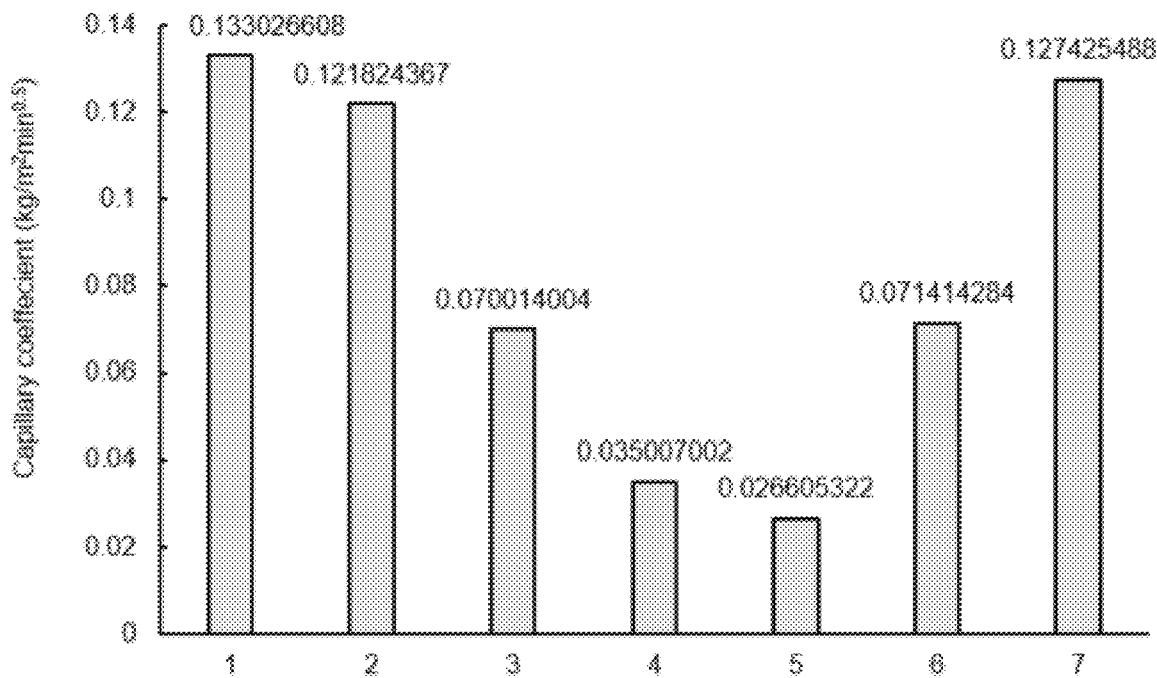
FIG. 7B is a graphical representation of the capillary coefficient for each of the test hemp-based mixtures of Table 2, according to an embodiment.

The degree of water absorption by capillarity indicates the degree of porosity of the mix. The rate of capillary suction depends on the network of porosity and tortuosity, the tensile strength of water, and the pore size of a water meniscus. FIG. 7A is a graphical representation of the cumulative mass of water vs. time for each of the test hemp-based mixtures of Table 2, according to an embodiment. As shown in FIG. 7A, reducing the alkali-activator content in the mixture has significantly reduced the mass of absorbed water for mixture 5 compared to mixture 1. FIG. 7B is a graphical representation of the capillary coefficient for each of the test hemp-based mixtures of Table 2, according to an embodiment. As shown in FIG. 7B, the capillary coefficient of mixture 5 (0.027 kg/m$^2$ min$^{0.5}$) is approximately 80% less than that of mixture 1 (0.133 kg/m$^2$ min$^{0.5}$). This is due to the reduced porosity and increased tortuosity associated with decreasing the alkali activator content. In contrast, increasing the content of coarse hemp hurd has increased the mass of water absorbed and the capillary coefficient for mixes 6 and 7, respectively. The capillary coefficient for mixture 7 (0.127 kg/m$^2$ min$^{0.5}$) is approximately 4.7 times greater than mixture 5 (0.027 kg/m$^2$ min$^{0.5}$). Increasing the content of coarse hemp hurd will affect the pore network by creating extra voids which will increase the porosity and the capillary coefficient of the mix. The capillary coefficient for all mixes is in the range between 0.0267 and 0.133 kg/m$^2$ min$^{0.5}$, which is lower than the value of around 0.33 kg/m$^2$ min$^{0.5}$ for fly ash alkaline-based mortars reinforced with different contents of coarse hemp hurd.

Figure 8:
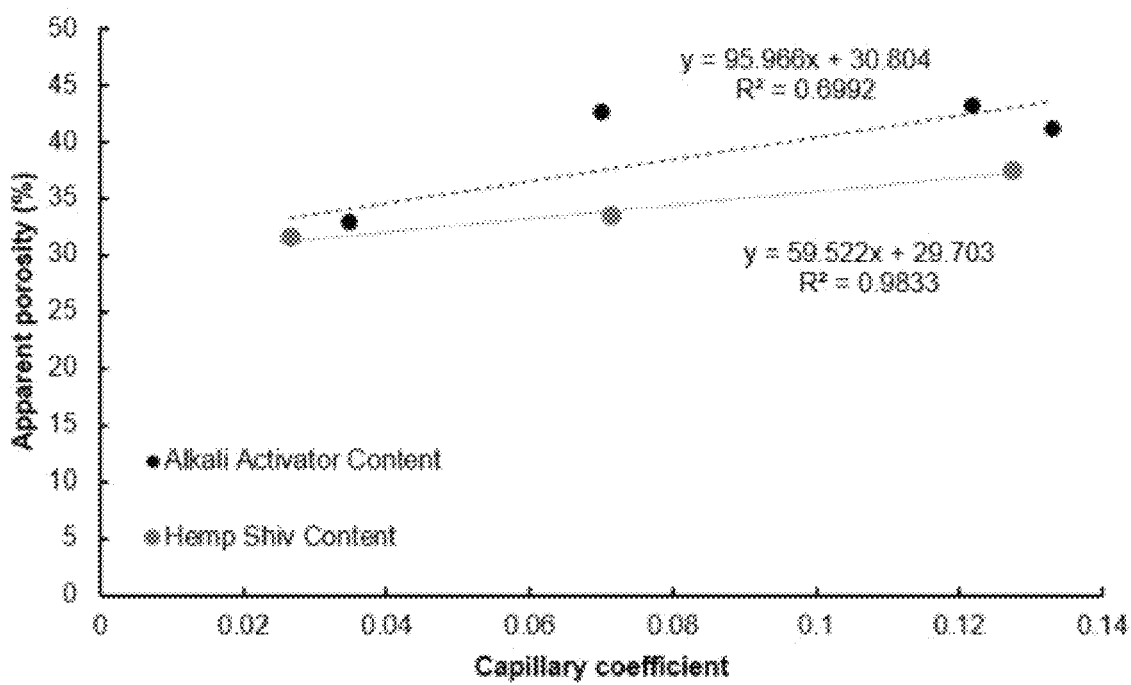
FIG. 8 is a graphical representation of the relationship between the apparent porosity vs. the capillary coefficient, according to an embodiment.

The capillary coefficient is highly correlated with the apparent porosity as shown in FIG. 8. However, the correlation is higher for mixes with varying coarse hemp hurd content compared to mixes with different alkali activator content. On the other hand, the changes in the apparent porosity are more significant when the alkali activator content is increased. The apparent porosity has decreased by 23% for mixture 5 in comparison to mixture 1. This indicates that the alkali-activator content has a more significant influence on the apparent porosity.

Figure 9:
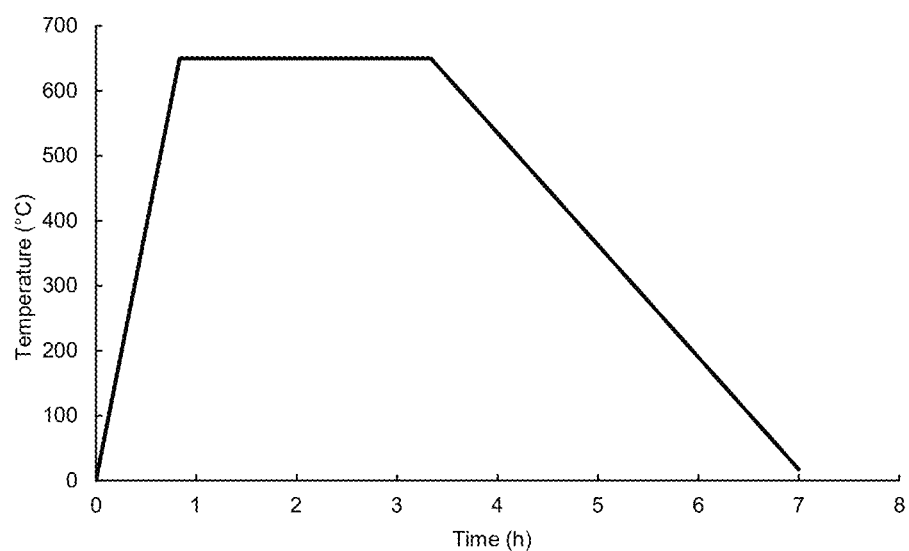
FIG. 9 is a graphical illustration of the adopted temperature protocol used in the high-temperature test, according to an embodiment.

High temperature resistance: Two cubes were subjected to high temperatures to assess the post-heating residual-strength when subjected to elevated temperatures. FIG. 9 illustrates the temperature regime used to evaluate samples exposed to high temperatures. The temperature was gradually elevated until it reached a value of 650° C. The temperature of the samples was kept constant at 650° C. for 2.5 hours and then allowed to cool at 20° C. To assess the influence of high temperature, the mass and compressive strength of each sample was measured before and after high-temperature exposure. This experiment aims to simulate the fire resistance of the produced materials.

Figure 10A:
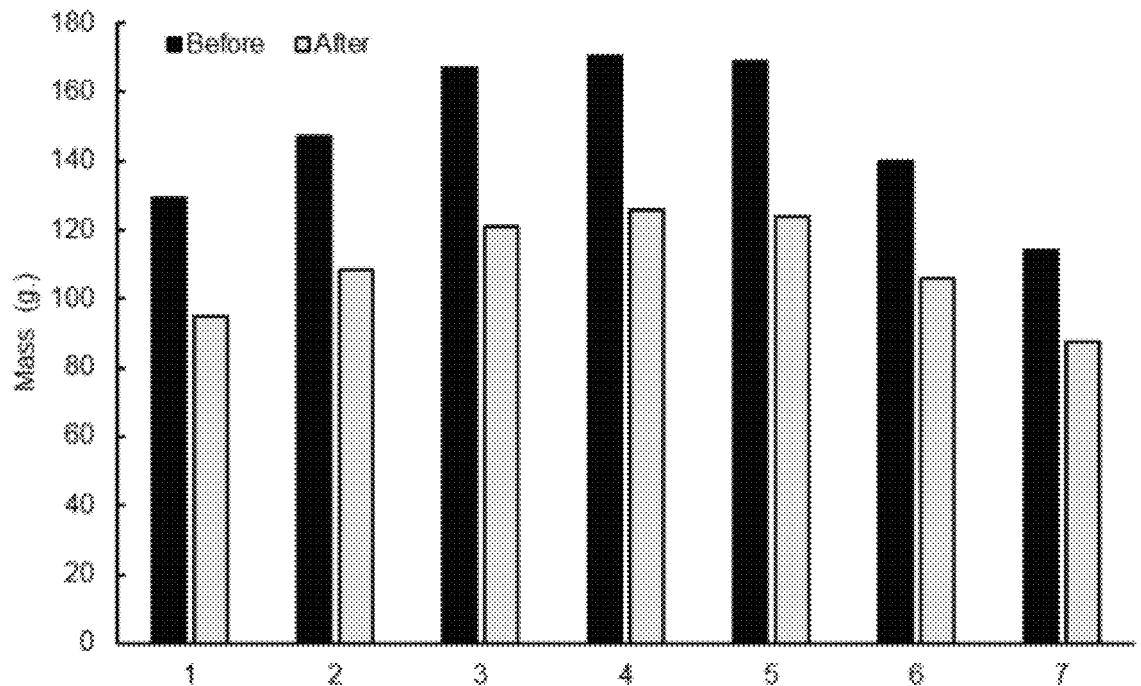
FIGS. 10A and 10B are graphical representation of the effects of high temperature on mass and compressive strength, respectively, according to an embodiment.
Figure 10B:
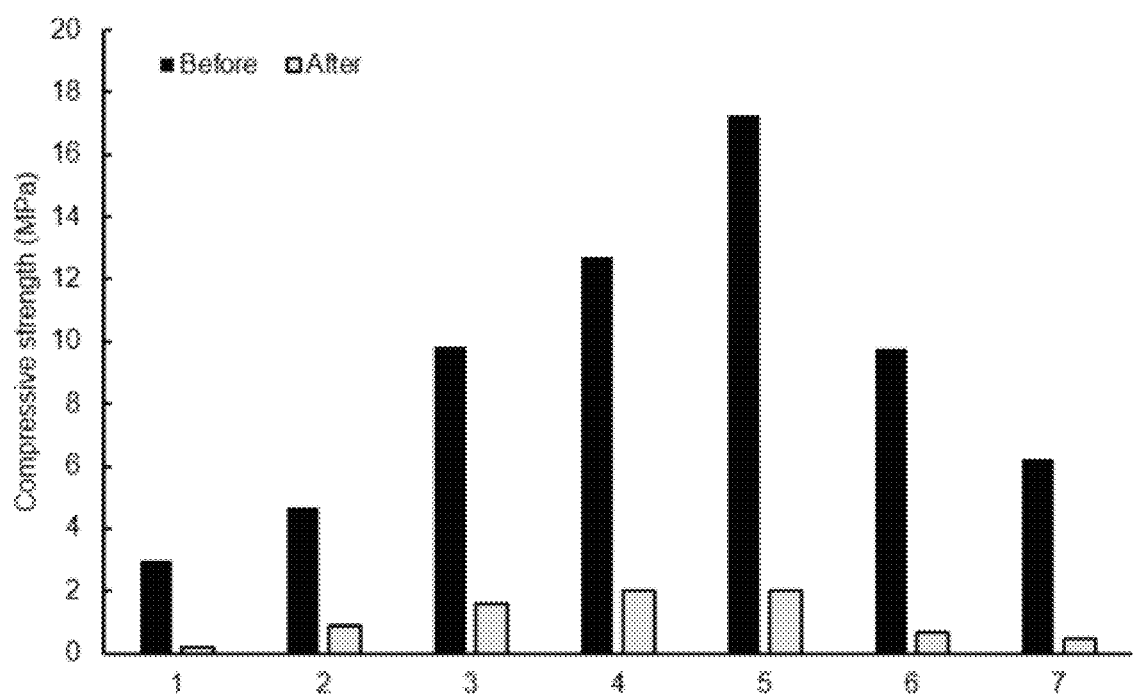

High temperature exposure has a significant impact on the mass and compressive strength of the produced alkali-activated hemp mixtures, as shown in FIGS. 10A and 10B. After exposure to the heating protocol, all samples have experienced a similar and significant mass loss ranging between 23 to 27.5%. The loss in the compressive strength was also substantial for all the mixes with losses greater than 80% of the original compressive strength. However, more strength reduction can be seen in mixture 1 having the greatest amounts of alkali-activator content and correspondingly the weakest matrix in phase one mixtures as compared to mixture 5. Increasing the hemp content, on the other hand, has reduced the loss in compressive strength for mixture 7 having the highest hemp content compared to mixture 5 with the lowest hemp content. Increasing the hemp content creates a denser matrix which reduces the strength loss after high temperature exposure. The loss in compressive strength can be explained by the melting of the hurd at high temperatures, which increases the permeability of the samples and creates extra air voids. FIGS. 10A and 10B are graphical representation of the effects of high temperature on mass and compressive strength, respectively.

Figure 11A:
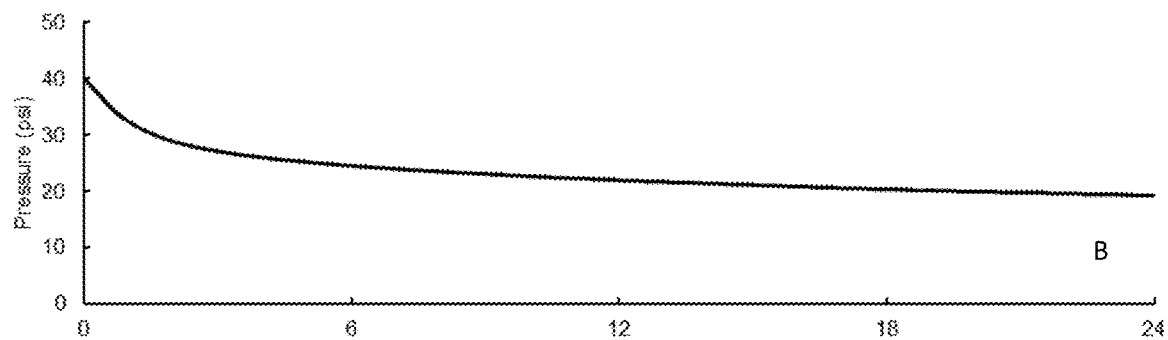
FIGS. 11A, 11B, and 11C are graphical illustrations of the pressure conditions, relative humidity conditions, and temperature conditions for the carbonation resistance studies.
Figure 11B:
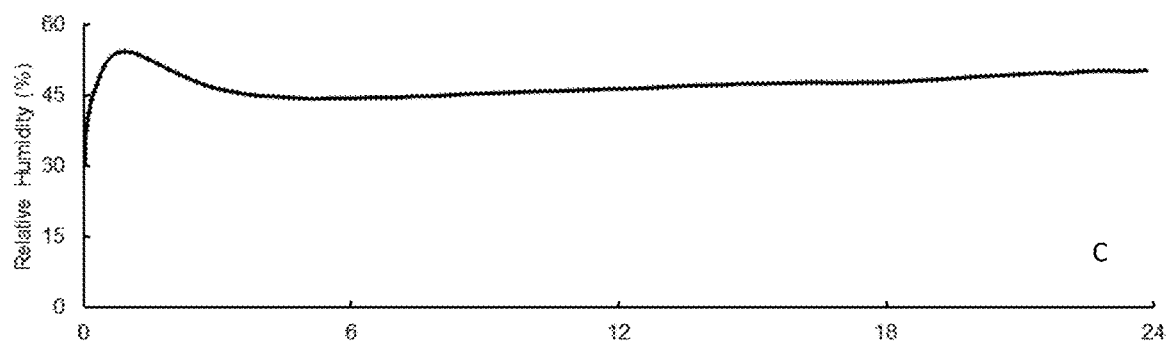
Figure 11C:
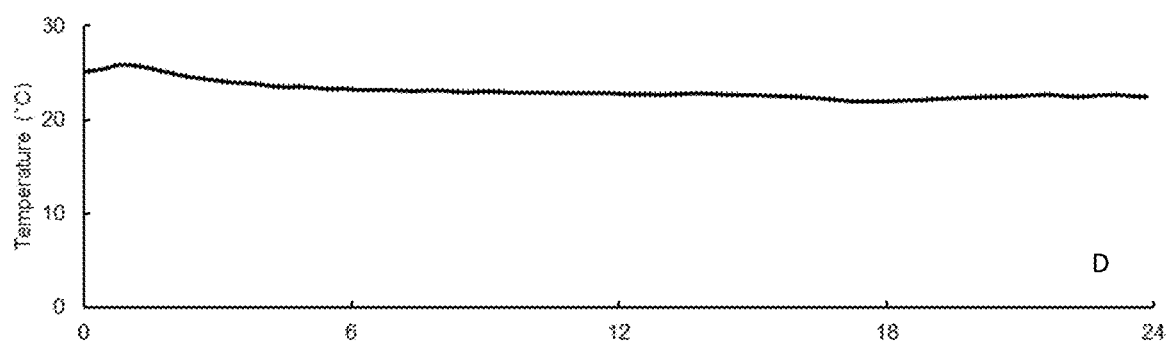

Carbonation resistance: Cubes (50 mm nominal) from each mixture at 28 days were used to determine the carbonation resistance. The specimens were placed in a carbonation chamber for two days. $CO_2$ gas was circulated with a concentration of 5%, 50% relative humidity (RH), pressure of 40 psi, and a temperature of 23° C. The influence of carbonation was then investigated by assessing the density and compressive strength before and after $CO_2$ exposure. To assess the degree of $CO_2$ sequestration, three carbonated specimens of each mixture were placed in the oven at 105° C. for 24 hours to evaporate the absorbed water. FIGS. 11A, 11B, and 11C are graphical illustrations of the pressure conditions, relative humidity conditions, and (d) temperature conditions for the carbonation resistance studies. The weight of each specimen was then measured. To calculate the water bound to the hydration products and the carbon dioxide in carbonates, the carbonated samples were transferred into a calciner at a temperature ranging from 500 to 850° C. for four hours.

Figure 12A:
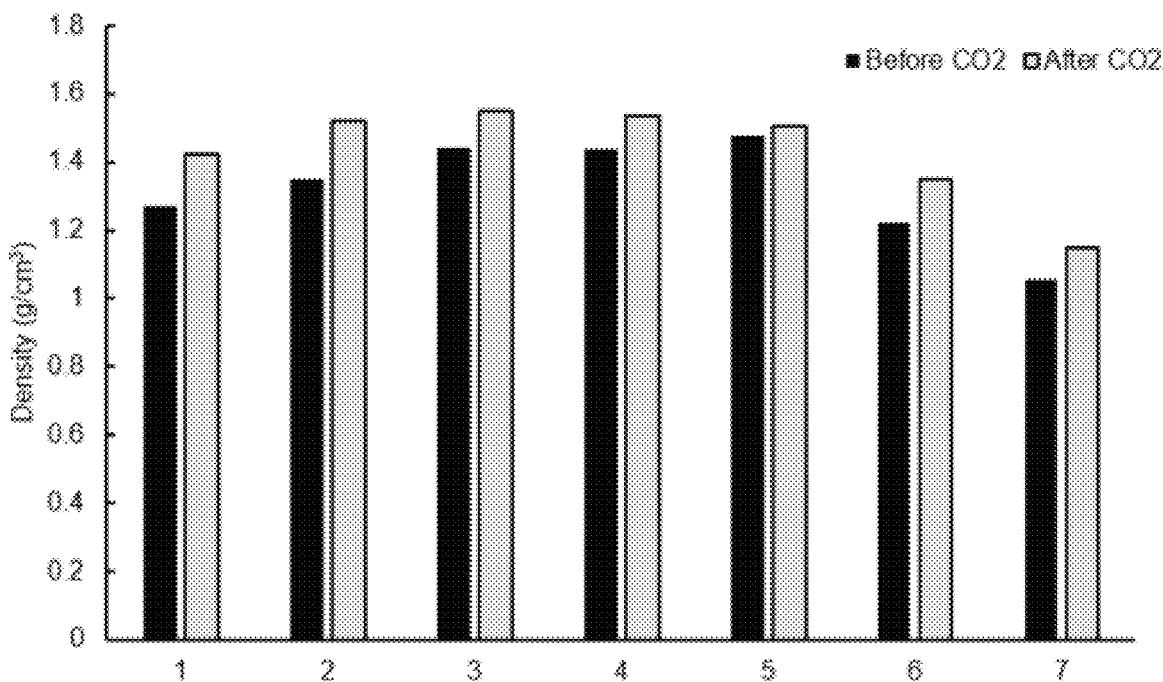
FIGS. 12A and 12B are graphical representation of the effects of carbonation on density, and compressive strength, respectively, according to an embodiment.
Figure 12B:
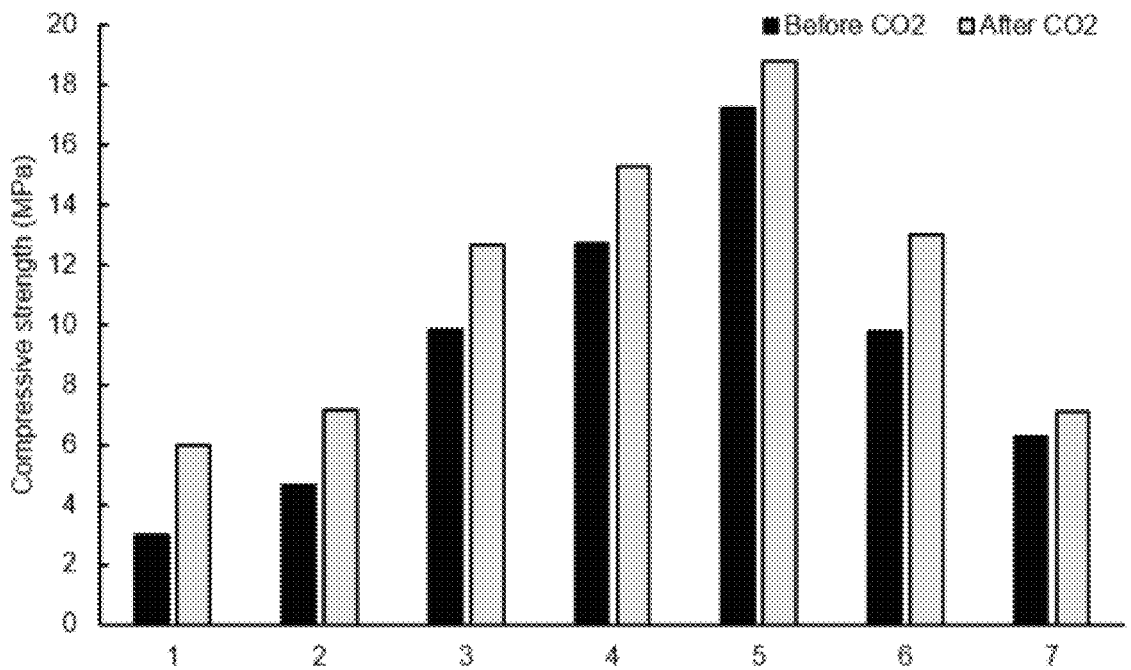

FIGS. 12A and 12B depicts the influence of carbonation on the density and compressive strength of hemp-hurd-based alkali-activated mixes. After carbonation, the density and compressive strength of all mixes have been increased. The percent increase in density ranges from 2 to 12.5%, and mixture 2 has the greatest density increase of approximately 12.5% after carbonation. The increase in the compressive strength varies between 9% for mixture 5 and 100% mixture 1 and it is greater than the increase in density after carbonation. This increase is due to the availability of large amounts of sodium silicate for the polymerization and the carbonation reaction. The portion used in the carbonation reaction will consume the amounts of hydroxide (OH−) in the pore solution and release large amounts of calcium ions (Ca+2), hydroxides (OH−), sodium ions (Na+), and silicate ions (SiO3-2). These ions will react with carbon dioxide ($CO_2$) and produce water, calcium carbonate, and C—S—H gel. The products of the carbonation imposes additional stresses on the matrix of the produced samples, increasing the strength and density of the mixes provided that sufficient voids are available to deposit the products of the carbonation process.

Efflorescence: Cubes with 50 mm edges were used to evaluate efflorescence. The cubes were kept in a tray half-filled with distilled water at room temperature and were inspected visually at 24, 48, 72, and 503 hours. The influence of efflorescence on the compressive strength was then evaluated. Efflorescence is one of the problems associated with alkali-activated binders exposed to water or a high humidity environment. It is responsible for forming a chemical reaction product on the external surface of alkali-activated materials. The durability and long-term performance may be affected due to cracks associated with high amounts of efflorescence. Therefore, this evaluation is necessary to assess the feasibility of alkali-activated hemp hurd mixture as a construction building material.

Figure 13A:
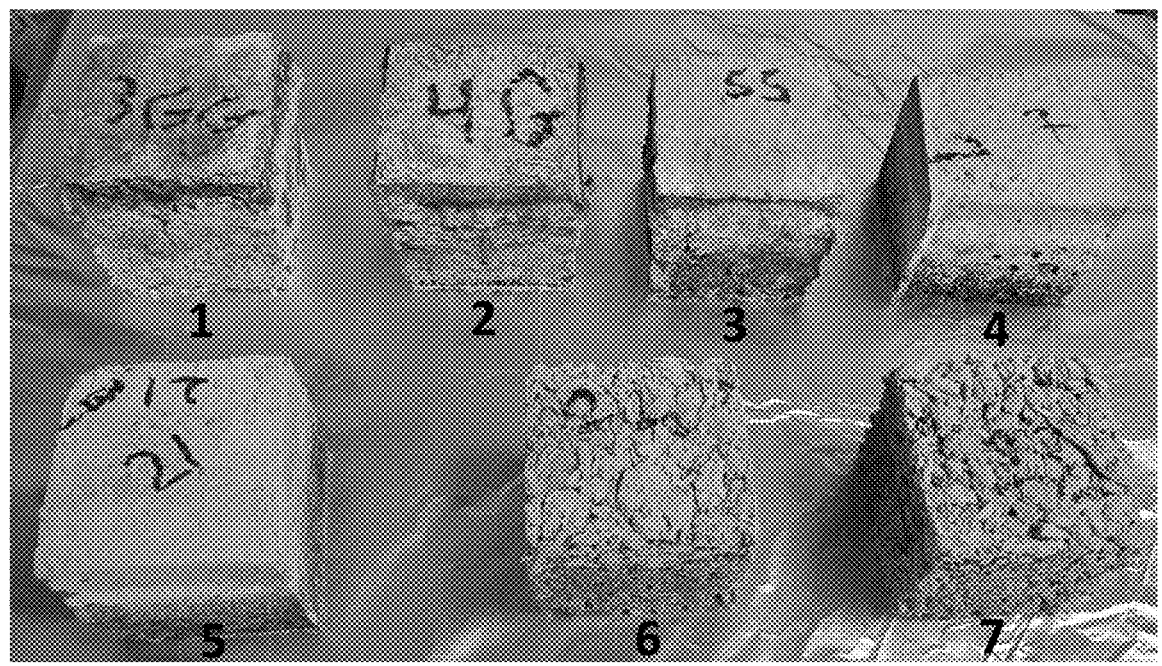
FIG. 13A is a photograph of the various samples after 21 days to present a visual observation of the effect of alkali activator and hemp content on the rate of efflorescence, according to an embodiment.
Figure 13B:
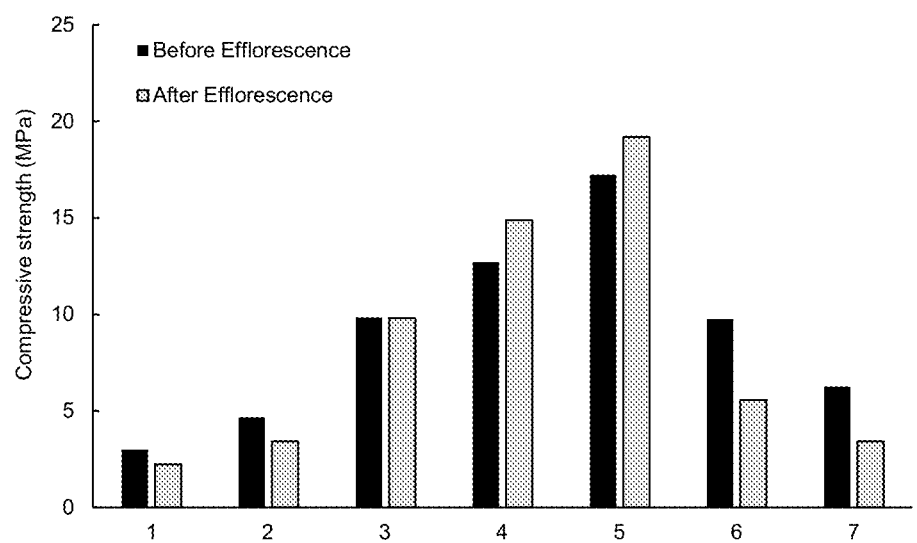
FIG. 13B is a graphical illustration of the effect of efflorescence on the compressive strength after 21 days for each of the test hemp-based mixtures of Table 2, according to an embodiment.

FIG. 13A is a photograph of the various samples after 21 days to present a visual observation of the effect of alkali activator and hemp content on the rate of efflorescence, according to an embodiment. FIG. 13B is a graphical illustration of the effect of efflorescence on the compressive strength after 21 days for each of the test hemp-based mixtures of Table 2, according to an embodiment. Gradually reducing the alkali activator content leads to a reduction in the rate of efflorescence. The efflorescence can be visually observed for mixture 1 through mixture 3 and was not present in mixture 4 and 5. The reduction of alkali activator content is accompanied with a reduction of free sodium content in the matrix. The free sodium participates in the chemical reactions, and this correspondingly reduce the potential of forming efflorescence. Compressive strength is increased because of the reduction of free sodium in the mixture. For instance, the efflorescence associated with mixture 1 and mixture 2 has reduced the compressive strength by approximately 26% and 27%, respectively. Mixture 3 did not experience a change in the compressive strength after efflorescence, but the compressive strength for mixture 4 and mixture 5 have increased by approximately 17 and 11% respectively.

Increasing the hemp content on the other hand will further reduce the rate of efflorescence as can be seen for mixture 6 and mixture 7 in FIG. 13A. This reduction is due to the higher porosity associated with increasing the hemp hurd content which creates additional gaps that will be filled with the products of the efflorescence mainly sodium carbonate heptahydrate. After efflorescence, the compressive strength of mixture 6 and mixture 7 has reduced by almost 45%. This reduction is associated with the increased porosity because of increasing the hemp-hurd content.

Global warming potential (GWP) and carbon footprint: Table 3 presents the global warming potential (GWP) for each component of the produced hemp hurd-based alkali-activated material. The assessment of GWP of each component has been performed using the EcoInvent database except for the negative GWP of the hemp, which was obtained from reference. The negative GWP of the hemp has been explained because of the biogenic $CO_2$ uptake during hemp production.

Figure 14A:
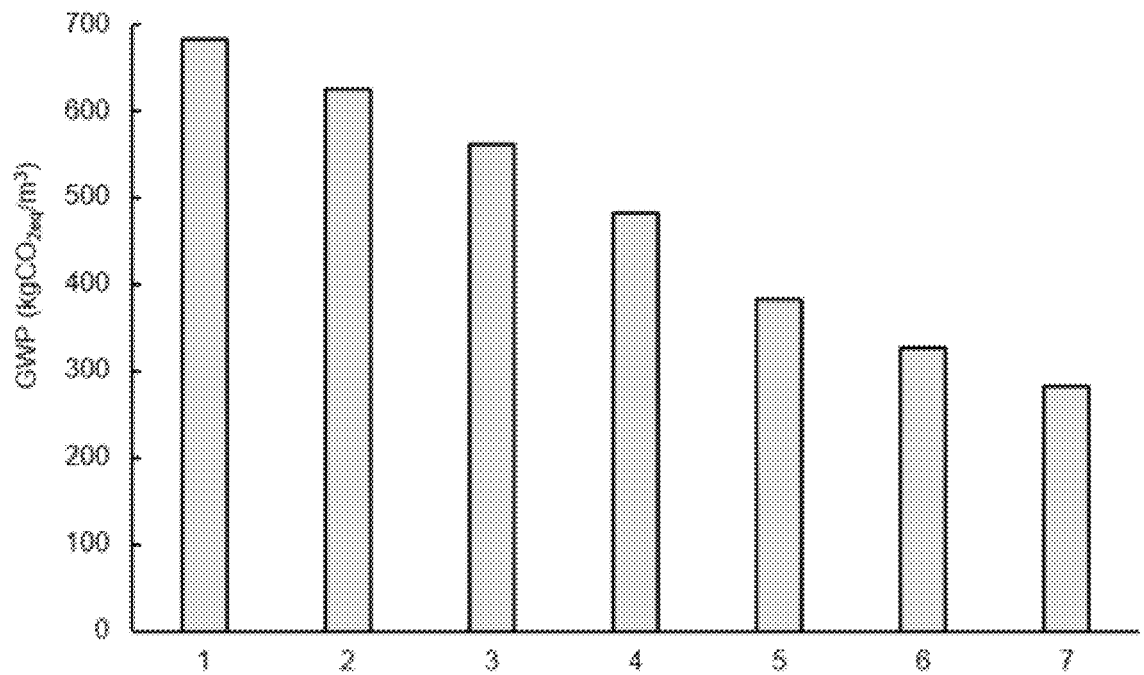
FIGS. 14A, 14B, 14C, 14D, and 14E are graphical representation of the effects of the alkali activator and hemp content on GWP ($kgCO_{2eq}/m^3$), GWP/Strength ($kgCO_{2eq}/m^3MPa$), $CO_2$ sequestration ($kgCO_{2eq}/m^3$), GHG emission ($kgCO_{2eq}/m^3$) and carbon footprint ($kgCO_{2eq}/m^3$), and carbon footprint/strength ($kgCO_{2eq}/m^3MPa$), respectively.
Figure 14B:
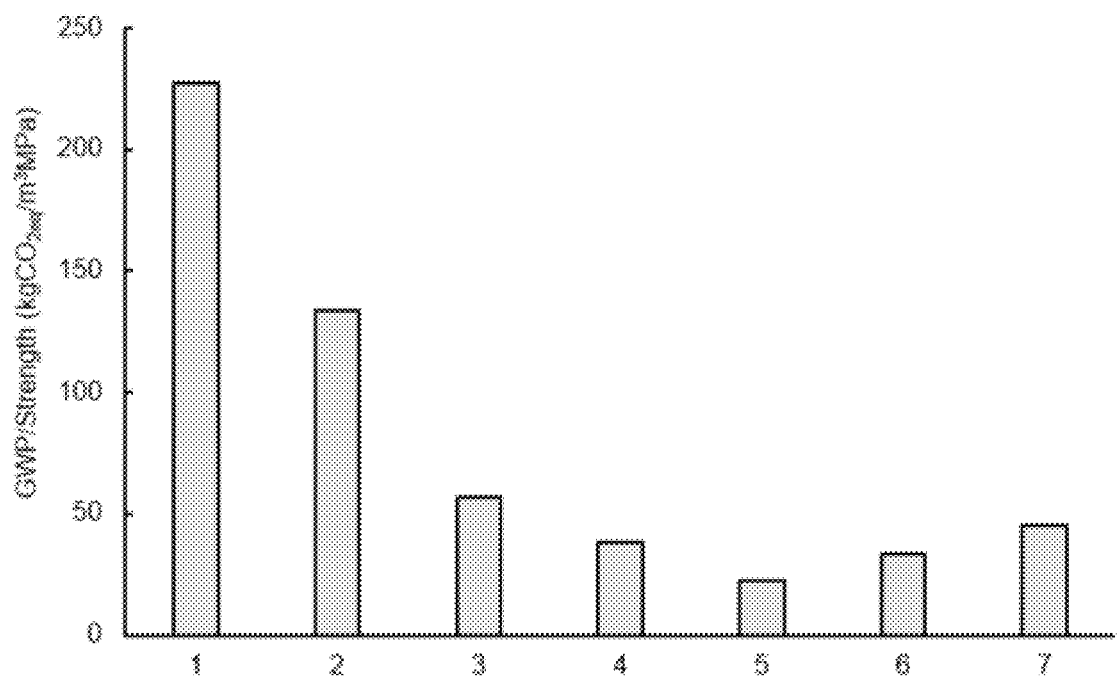

The influence of using different contents of the alkali activator and the hemp hurd on the GWP and the carbon footprint is presented in FIGS. 14A-14E. The results indicate that the GWP decreases with reducing the alkali activator content, as shown in FIG. 14A. It also further decreases as a result of increasing the hemp hurd content in the mix. The least GWP of 282.68 $kgCO_{2eq}/m^3$ has been recorded for mixture 7 which has the greatest amount of hemp hurd. However, when evaluating the GWP to strength ratio, mixture 5 has the lowest value, indicating that this mixture yields a relatively low GWP associated with the highest strength possible, as shown in FIG. 14B.

Figure 14C:
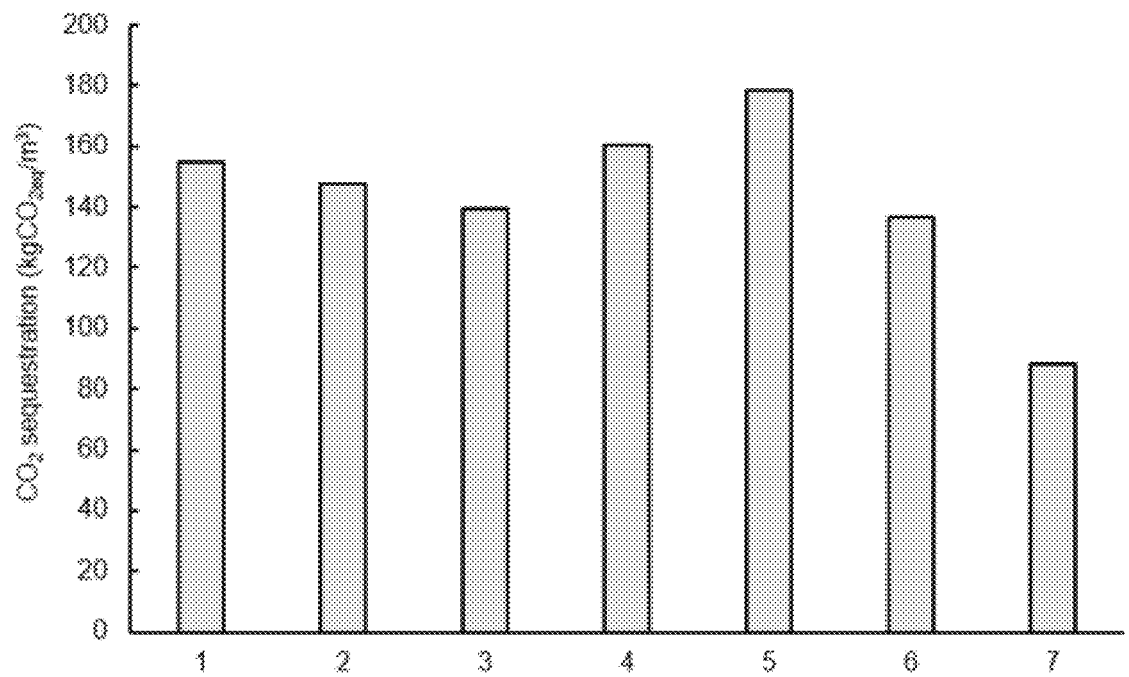

An increase in the degree of $CO_2$ sequestration can be seen in FIG. 14C as result of carbonation curing and decreasing the alkali activator content in the mix. Mixture 5 with the least amount of alkali activator content has the greatest carbon sequestration capacity of 178.32 kgCO2 eq/m3. This mixture also has the smallest value of the water capillary coefficient and correspondingly the least degree of permeability as have been mentioned in an earlier section. This will reduce degree of CO2 diffusion which is governed by the degree of porosity and permeability of the material. Increasing the hemp content in the mixture has reduced the degree of CO2 sequestration in the mixture because of the increased permeability represented by the high capillary coefficient of mixtures with high coarse hemp hurd content.

Figure 14D:
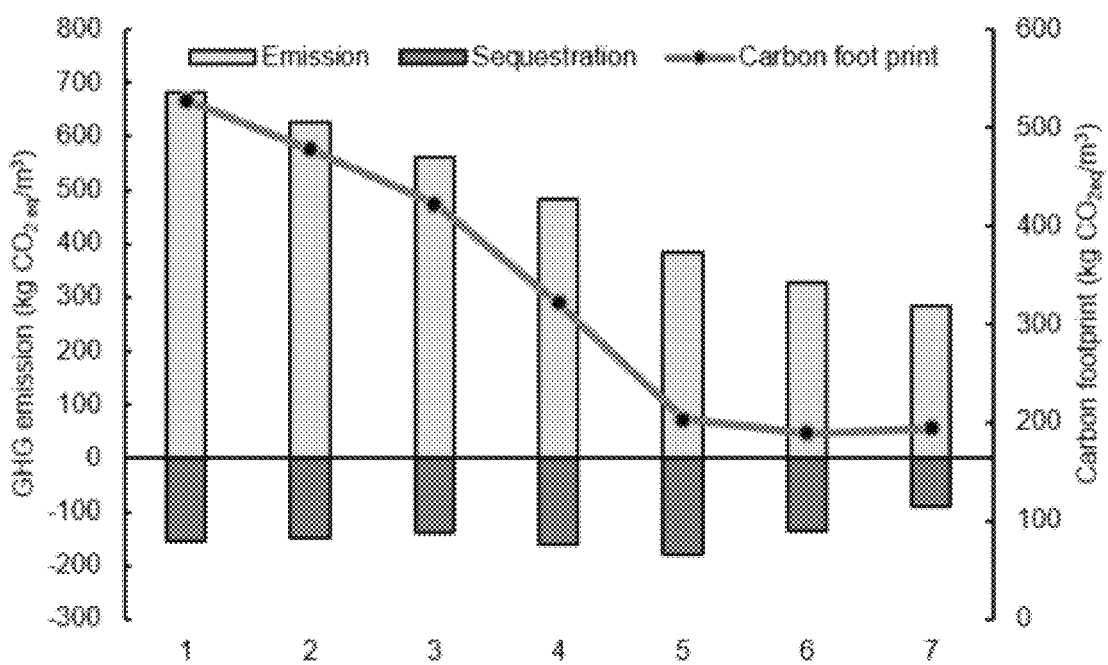
Figure 14E:
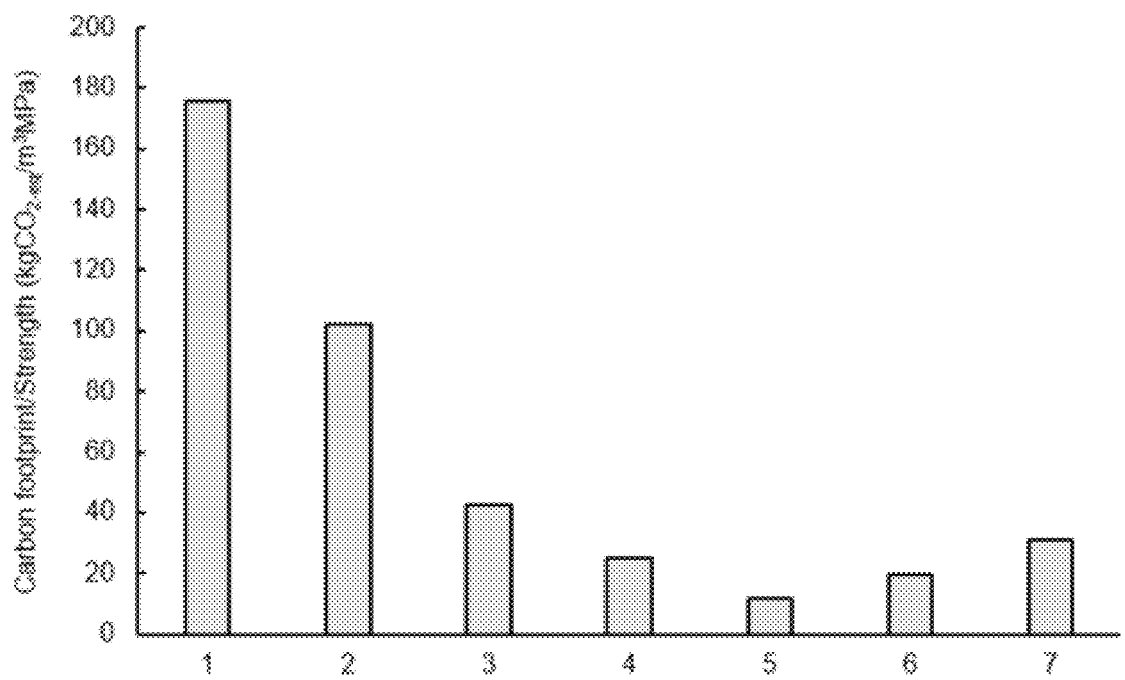

The degree of greenhouse gases (GHG) emission, sequestration, and the carbon footprint corresponding to each mixture is presented in FIG. 14D. Increasing the alkali activator content reduces the rate of GHG emission and correspondingly increase the degree of GHG sequestration. The rate of CO2 sequestration of mixture 5 is 47% of the total GHG emission which is the highest compared to the other mixes produced. The degree of GHG emission further decrease with increasing the coarse hemp hurd content. However, the degree of GHG sequestration is reduced when the coarse hemp hurd content is increased as a result of the increased permeability. The results also show that carbon sequestration has resulted in a carbon footprint of approximately 204 and 195 kgCO2 eq/m3 for mixture 5 and 7 having the least alkali activator and the highest coarse hemp hurd content respectively.

Reduction in the carbon footprint is more significant when decreasing the alkali activator. However, the lowest carbon footprint is associated with mixture 6 having the least amount of alkali activator content and an increased coarse hemp hurd content. Further increase in the coarse hemp hurd content will increase the overall carbon footprint as can be see for mixture 7. According to FIG. 14E which represents the carbon footprint to strength ratio of all mixes produced, mixture 5 with the least alkali activator content has the lowest carbon footprint to strength ratio. This means that this mixture yields a relatively low carbon footprint associated with the highest compressive strength.

TABLE 3

Global warming potential ($kgCO_{2eq}$) of each component in the coarse hemp hurd-based alkali-activated mortar

|  | GGBFS | $Na_2SO_3$ | NaOH | Water | Hemp powder or hurd |
|---|---|---|---|---|---|
| GWP ($kgCO_2eq$) | 0.02 | 1.64 | 0.85 | 0.0001 | −1.7 [38] |

The disclosed data indicate the mechanical and durability properties of hemp-based alkali-activated materials to be used as sustainable construction bricks. In certain embodiments, gradually reducing the alkali activator content increases the density and compressive strength up to 1.2 $g/cm^3$ and 17 MPa, respectively. The compressive strength is highly correlated with the dry density of developed hemp-based alkali-activated material. The alkali activator content has more influence on increasing the compressive strength rate than the coarse hemp hurd content. Reducing the alkali activator content reduces the rate of water absorption by immersion down to 25% and increasing the coarse hemp hurd content increases it up to 40%. The alkali activator content indicated higher impact on the apparent porosity and the degree of water absorption by immersion than the coarse hemp hurd content. Reducing the alkali activator content will decrease the capillary coefficient to 0.027 $kg/m^2 \, min^{0.5}$ due to the reduced porosity. In contrast, increasing the coarse hemp hurd content will increase porosity and the capillary coefficient up to 38% and 0.127 $kg/m^2 \, min^{0.5}$, respectively. Exposing mixtures to $CO_2$ gas flow increases the density and compressive strength by 2-12% and 9-100%, respectively. The rate of efflorescence is reduced when the alkali activator content is decreased, or the coarse hemp hurd content is increased. After efflorescence, samples with the least alkali activator content (mixtures 4 and 5) have witnessed a 17% and 11% increase in the compressive strength. In contrast, the compressive strength has decreased by an average of 44% for samples with an increased coarse hemp hurd content. Reducing the alkali activator content increases $CO_2$ sequestration up to 180 $kgCO_{2eq}/m^3$, while increasing the coarse hemp hurd content reduces it to 88 $kgCO_{2eq}/m^3$.

Example 2

Figure 15:
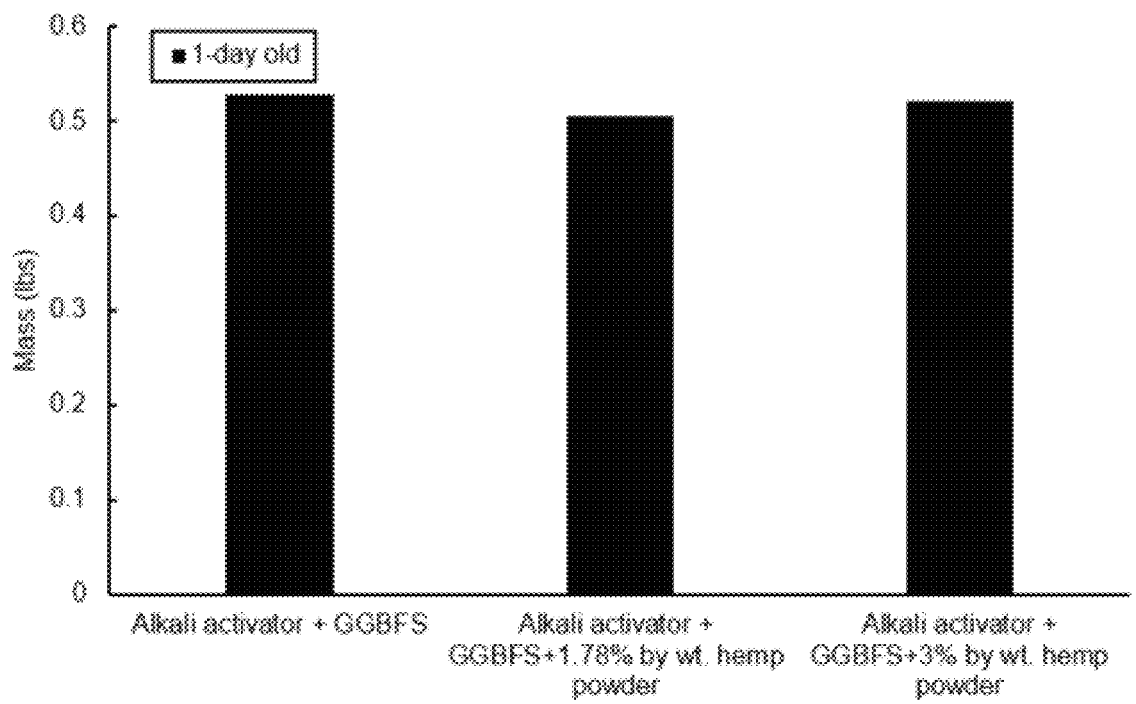
FIG. 15 is a graphical representation of the effects of the presence of coarse hemp hurd on the density of an alkali-activated material, AA-GGBFS paste, according to an embodiment.
Figure 16:
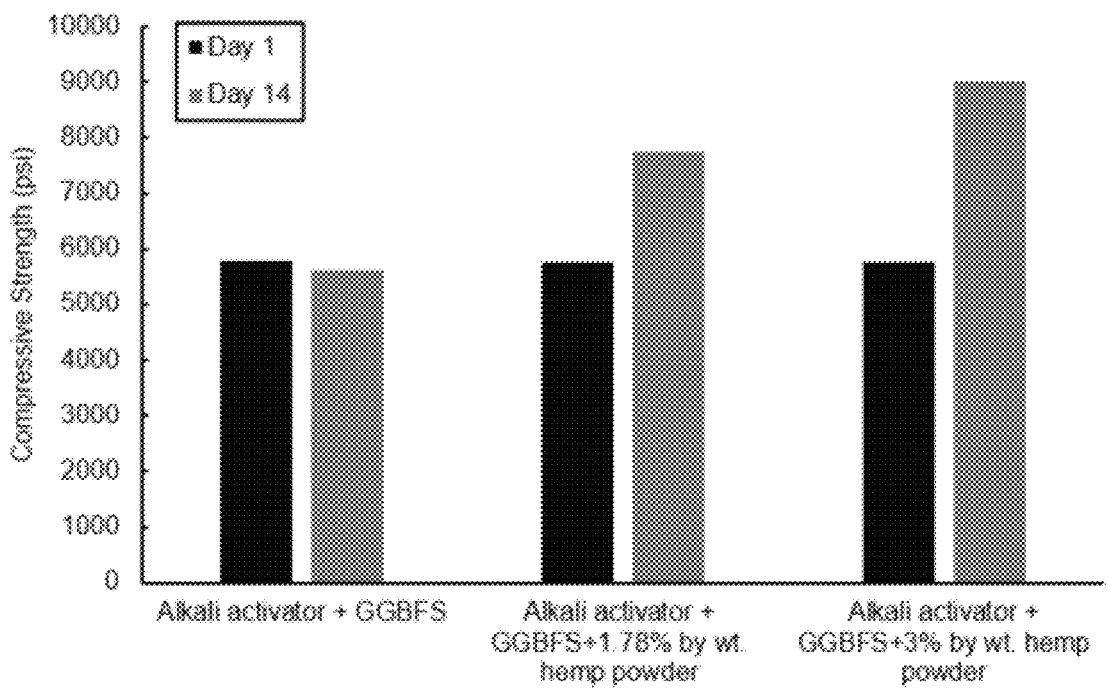
FIG. 16 is a graphical representation of the effects of the presence of coarse hemp hurd on the compressive strength of an alkali-activated material, AA-GGBFS paste, according to an embodiment.

To assess the effect of the hemp-hurd powder on the alkali-activated ground granulated blast furnace slag (GGBFS, Grade 100) binder, three mixtures were prepared. A neat alkali-activated GGBFS paste was prepared, and two others had 1.78% and 3% Ground hemp hurd (100-micron max) GGBFS replacement by weight. Each mixture was placed into 50 mm cube molds and exposed to 60 degrees C. for 24 hours. Following heat curing, the samples were weighed and tested with an average of three cube results as shown in FIG. 15 and FIG. 16. Samples were again tested at 14 days. There was increasing strength beyond the 1-day mark, where the 3% replacement resulted in a 60% increase in strength. Further, the inclusion of the hemp-hurd contributed to significant changes in rheology, creating a very stiff mixture at 3%.

The embodiments have been described broadly and generically herein. Each of the narrower species and subgeneric groupings falling within the generic disclosure also form part of the embodiments. For all ranges disclosed herein, such ranges are intended to include any combination of the stated upper and lower limits, even if specific combinations are not specifically described. It should be understood that although the disclosure contains certain aspects, embodiments, and optional features, modification, improvement and variation of such aspects, embodiments, and optional features can be resorted to by those skilled in the art, and that such modifications, improvements, and variations are considered to be within the scope of this disclosure.

What is claimed is:

1. A hemp-based concrete composition comprising:
   an aluminosilicate-based binder containing a first hemp derivative and ground granulated blast furnace slag; and
   an aggregate containing a second hemp derivative, the first and second derivatives having different particle dimensions and being derived from a woody core of a hemp plant.

2. The composition of claim 1, wherein the hemp-based concrete composition has a density of or less than 1.5 g/cm$^3$.

3. The composition of claim 1, wherein the first hemp derivative is substantially hemp hurd powder.

4. The composition of claim 1, wherein the second hemp derivative is substantially hemp hurd.

5. A hemp-based concrete composition comprising:
   an aluminosilicate-based binder containing a hemp hurd powder, a mineral aggregate, and an alkali activator; and
   an aggregate containing a hemp derivative, the hemp derivative being derived from a woody core of a hemp plant and having different particle dimensions than the hemp hurd powder.

6. The composition of claim 5, wherein the mineral aggregate contains river sand, fly ash, or a combination thereof.

7. The composition of claim 5, wherein the alkali activator contains one or more of a silicate, a metal aluminate, an alkali-metal hydroxide, ammonium hydroxide, and an alkaline earth metal hydroxide.

8. The composition of claim 5, wherein the alkali activator contains sodium silicate and sodium hydroxide.

9. The composition of claim 8, wherein the alkali activator contains sodium silicate and sodium hydroxide at a ratio of 2.5:1.

10. The composition of claim 8, wherein the alkali activator contains sodium silicate and sodium hydroxide at a molality of 10 M.

11. The composition of claim 5, wherein the hemp hurd powder is present in the aluminosilicate-based binder at an amount ranging from about 1 wt. % to about 5 wt. %.

12. A hemp-based concrete composition comprising:
   an aluminosilicate-based binder containing a first hemp derivative; and
   an aggregate containing a second hemp derivative, the first and second derivatives having different particle dimensions and being derived from a woody core of a hemp plant, wherein the concrete composition has a compressive strength of or greater than 4 MPa.

13. The composition of claim 12, wherein the first hemp derivative is substantially hemp hurd powder.

14. The composition of claim 12, wherein the second hemp derivative is substantially hemp hurd.

15. The composition of claim 12, wherein the aluminosilicate-based binder further contains one or more of ordinary Portland cement (OPC), lime, zeolite, magnesium oxide cement, magnesium phosphate cement, and ground granulated blast furnace slag.

* * * * *